US010656865B1

(12) United States Patent
Janse van Rensburg et al.

(10) Patent No.: US 10,656,865 B1
(45) Date of Patent: May 19, 2020

(54) VIRTUALIZED BLOCK DEVICE BACKING FOR VIRTUALIZATION CONTAINERS

(71) Applicant: Amazon Technologies, Inc., Seattle, WA (US)

(72) Inventors: Cornelle Christiaan Pretorius Janse van Rensburg, Seattle, WA (US); Samuel Benjamin Karp, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 341 days.

(21) Appl. No.: 15/377,912

(22) Filed: Dec. 13, 2016

(51) Int. Cl.
*G06F 12/00* (2006.01)
*G06F 13/00* (2006.01)
*G06F 3/06* (2006.01)

(52) U.S. Cl.
CPC .............. *G06F 3/065* (2013.01); *G06F 3/064* (2013.01); *G06F 3/067* (2013.01); *G06F 3/0619* (2013.01)

(58) Field of Classification Search
CPC .... G06F 3/0662; G06F 12/00; G06F 11/1446; G06F 3/065; G06F 3/0619; G06F 3/064; G06F 3/067
USPC .................. 711/100, 154, 162, 200
See application file for complete search history.

(56) References Cited

U.S. PATENT DOCUMENTS

| | | | |
|---|---|---|---|
| 6,594,744 B1* | 7/2003 | Humlicek | G06F 3/0601 707/999.202 |
| 8,769,224 B1* | 7/2014 | Raj | G06F 11/1453 711/154 |
| 8,898,407 B1* | 11/2014 | Balasubramanian | G06F 11/1451 711/161 |
| 9,043,567 B1* | 5/2015 | Modukuri | G06F 16/00 711/162 |
| 2017/0249216 A1* | 8/2017 | Bellur | G06F 3/06 |

OTHER PUBLICATIONS

"Docker and the Device Mapper storage driver," *Docker, Inc.*, 2016, 20pp.
"Understand Images, Containers, and Storage Drivers," *Docker, Inc.*, 2016, 19pp.

* cited by examiner

*Primary Examiner* — Tuan V Thai
(74) *Attorney, Agent, or Firm* — Klarquist Sparkman, LLP

(57) ABSTRACT

Technologies are provided for backing virtualization containers with layered storage volumes stored in remote storage devices. A virtualization container can present a virtual storage volume to a process running in the virtualization container and handle data access requests from the process using a layered storage volume based on one or more read-only snapshots stored in one or more remote storage devices. Changes can be recorded in a read-write layer in one or more of the remote storage devices and associated with the layered storage volume. A new read-only snapshot can be created based on the data in the read-write storage layer and associated with the one or more read-only snapshots on which the layered storage volume is based. A virtualization container can be associated with a new layered storage volume based on the created read-only snapshot and the one or more read-only snapshots on which it is based.

9 Claims, 11 Drawing Sheets

VIRTUALIZED BLOCK DEVICE BACKING FOR VIRTUALIZATION CONTAINERS

BACKGROUND

Operating system-level virtualization (sometimes also referred to as "container virtualization") was developed as an alternative to whole-system virtualization. Unlike a whole-system virtualization, which comprises a separate guest operating system running in a virtual machine on top of a host system, operating system-level virtualization uses virtualization containers running on top of a host system's operating system kernel. Processes running in virtualization containers can be isolated from one another using features of the host operating system, such as multiple user space instances. Since virtualization containers do not require guest operating systems, they use less storage space and memory than virtual machines in many cases, and often can be deployed more quickly than virtual machines.

Storage space requirements for virtualization containers can be further reduced in at least some cases by using layered container images. A layered container image comprises one or more read-only image layers. When data changes are made, instead of modifying the data directly in the layer where it resides, a new image layer is added and the changes are recorded in the new layer. Virtualization containers can share access to image layers. In some cases, this can reduce deployment time and storage space requirements since a given image layer may only have to be copied to a given host computer once. However, these potential time and space savings depend largely on the amount of overlap between container images used by virtualization containers on a given host. Furthermore, each image layer must still be copied to a given host computer at least once.

Therefore, there exists ample opportunity for improvement in technologies related to data storage and organization for virtualization containers.

DETAILED DESCRIPTION

Figure 1:
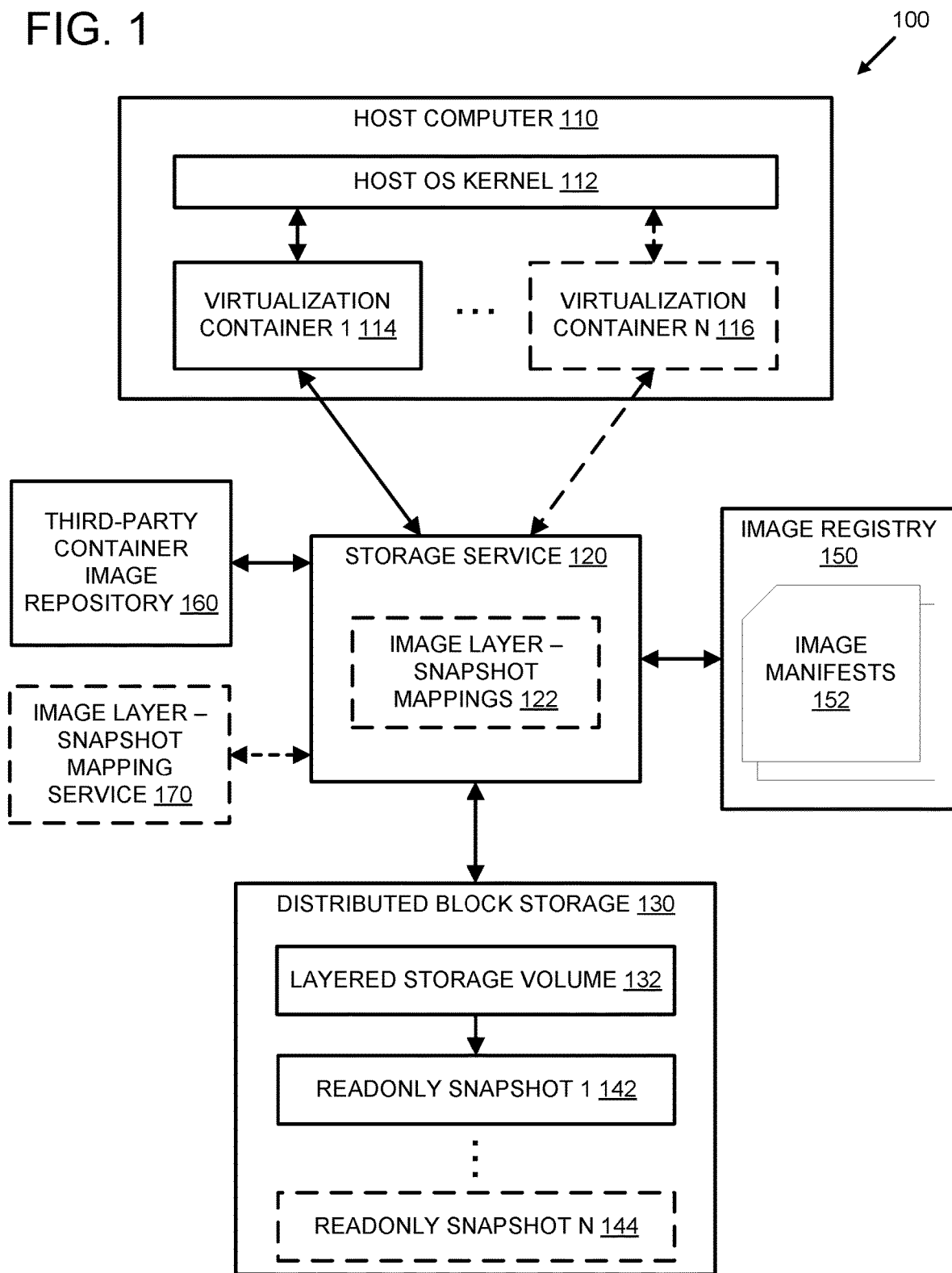
FIG. 1 is a system diagram showing an example system comprising a virtualization container configured to access a layered virtual volume in a distributed block store.

Although layered container images may reduce storage and deployment time requirements for virtualization containers in some cases, such savings are only applicable to scenarios where multiple virtualization containers on a given host computer require the same (or some of the same) container image layers. If a given virtualization container requires an image layer that is not already present on the host computer, the image layer must be copied to the host computer before a process can be launched within the virtualization container. Furthermore, each container image layer must be copied to each host computer at least once. This means that changes to services and/or applications must still be deployed to each host computer where a virtualization container running a service and/or application is instantiated. Even with each image layer only being deployed to each host computer once, deploying a container image to several different host computers can take a significant amount of time and consume a significant amount of storage space.

At least some of the embodiments of the technologies described herein solve these problems by linking virtualization containers to layered storage volumes stored in one or more remote storage devices. For example, instead of copying a container image to a host computer and then instantiating a virtualization container based on the container image, a virtualization container can be instantiated on the host computer and configured to access a remote layered storage volume.

In one embodiment, a virtualization container is configured to tunnel data access requests from one or more processes running in the virtualization container to a storage service. The storage service is configured to process the data access requests using a layered storage volume stored in one or more storage devices, wherein the layered storage volume is based on one or more read-only data snapshots.

In a different or further embodiment, a storage service is configured to create a container image using a layered storage volume associated with a virtualization container. The storage service can identify one or more read-only snapshots in one or more remote storage devices on which the layered storage volume is based and generate an image snapshot manifest identifying the one or more read-only snapshots. The storage service can then register the image snapshot manifest with an image repository. In a further embodiment, the storage service can detect data changes recorded in a read-write storage layer associated with the layered storage volume and create a new read-only snapshot in the remote one or more storage devices based on the detected changes. In such an embodiment, the new read-only snapshot can be included in the image snapshot manifest.

In a different or further embodiment, a virtualization container on a host computer can be linked to a new layered storage volume based on an image snapshot manifest. The image snapshot manifest can be retrieved from an image repository and analyzed to identify one or more read-only data snapshots. The one or more read-only data snapshots can be located in a remote storage comprising one or more storage devices. A new layered storage volume can be created in the remote storage, based on the one or more read-only snapshots. The new layered storage volume can be associated with the virtualization container and a process running in the virtualization container can interact with the linked layered storage volume as if it were a physical storage volume mounted directly to the host computer.

FIG. 1 is a system diagram showing an example system 100 comprising a host computer 110 comprising one or more virtualization containers (e.g., 114-116) configured to perform data access operations via a remote storage service 120. The remote storage service 120 is configured to access a layered storage volume 132 in a distributed block storage 130. Upon receipt of a data access operation from the virtualization container 114, the storage service 120 is configured to access data and/or perform data manipulation on one or more data items stored the layered storage volume 132.

The layered storage volume 132 is a layered virtual volume that is based on at least one read-only snapshot 142. The read-only snapshot 142 comprises one or more data items (not shown) that cannot be modified by data operations. In at least one embodiment, layered storage volume 132 is based on multiple read-only snapshots 142-144. In such an embodiment, each snapshot represents successive additions, modifications, and/or deletions of data items stored in a previous read-only snapshot. The storage service 120 is configured to process the one or more read-only snapshots 142-144 associated with the virtual layered storage volume 132 and to present a "flattened" view of the data associated with the layered storage volume 132 to the virtualization container 114.

The storage service 120 is connected to an image registry 150 comprising image manifests 152. An image manifest can comprise a list of one or more read-only image layers associated with a given image. In at least one embodiment, an image manifest listing more than one read-only image layer also describes a dependency (or lineage) relationship among the more than one read-only image layers. An image (a.k.a. a container image) can be presented to a virtualization container (e.g., 114) as a single, consolidated volume that can be mounted to a filesystem exposed to the virtualization container. Either directly, or via the storage service 120, the image registry 150 can be inspected to identify one or more images from which virtual volumes can be created. Once an image has been selected, the storage service 120 can retrieve an image manifest (of the image manifests 152) that is associated with the selected image. For example, an image can be identified by a unique identifier and the image manifest can be associated with the image identifier in the image registry 150. The storage service 120 can inspect the retrieved image manifest to identify one or more read-only image layers associated with the image. In at least one embodiment, the image manifest can contain identifiers of one or more read-only image layers that make up the image. An identifier for a read-only image layer can comprise a hash of data associated with the read-only image layer, although other types of identifiers are also possible.

In some scenarios, a requested image manifest may not be found in the image manifests 152. In such a scenario, the storage service 120 can attempt to locate image layer information for the requested image in another location, such as a third-party container image repository 160. The third-party container image repository 160 can be a third-party service configured to store information about container images. The third-party container image repository 160 can be hosted on one or more servers that is/are accessible by the storage service 120 over a network. The information stored about container images in the third-party container image repository 160 can comprise information identifying one or more read-only image layers associated with a given image. In a further embodiment, the third-party container image repository 160 can store the read-only image layers associated with the image.

In at least one embodiment, the storage service 120 can inspect information about the requested image that is stored in the third-party container image repository 160 to identify one or more read-only image layers associated with the requested image. The storage service can construct an image manifest for the requested image that comprises a list of the one or more read-only image layers. The storage service 120 can then store the created image manifest in the image registry 150 in association with the requested image. In a different or further embodiment, the third-party container image repository 160 can be configured to store image manifests. In such an embodiment, the storage service 120 can retrieve an image manifest for the requested image from the third-party container image repository 160 and store it in the image registry 150 in association with the requested image. Although one third-party container image repository 160 is depicted in FIG. 1, it is possible for the storage service 120 to access multiple third-party container image repositories. For example, a different read-only image layers can be retrieved from multiple different repositories.

The storage service 120 can identify one or more read-only snapshots (e.g., 142) stored in the distributed block storage 130 that are associated with the identified one or more read-only image layers associated with the requested image. The storage service 120 can create a new virtual volume (e.g., 132) in the distributed block storage 130 and associate the created virtual volume with the one or more identified read-only snapshots (e.g., 142). In at least one embodiment, the storage service 120 can identify a read-only snapshot associated with a given read-only image layer using image layer-snapshot mappings 122 stored in the storage service 120. For example, the image layer-snapshot mappings 122 can comprise associations between read-only image layer identifiers and storage locations of read-only snapshots (e.g., 142) in the distributes block storage 130 that contain data for the associated read-only image layers. In a different or further embodiment, the storage service 120 can identify read-only snapshots associated with the identified read-only image layers using a separate image layer-snapshot mapping service 170. In such an embodiment, the storage service 120 can transmit an identifier of a read-only image layer to the image-layer-snapshot mapping service 170 and receive a storage location in the distributed block storage 130 of a read-only snapshot associated with the read-only image layer in response.

In some cases, one or more of the identified read-only image layers may not be associated with read-only snapshots in the distributed block storage 130. In at least one embodiment, when an identified read-only image layer is not associated with a read-only snapshot in the distributed block storage 130, the storage service 120 can attempt to locate the read-only image layer in a separate storage location, such as the third-party container image repository 160. If the storage service 120 is able to locate the read-only image layer in the third-party container image repository 160, then the storage service 120 can retrieve the data for the read-only image layer from the third-party container image repository 160 and create a new read-only snapshot in the distributed block storage 130 using the retrieved data. The image layer—snapshot mappings 122 (and/or the image-layer—snapshot mapping service 170) can be updated to include a mapping between the read-only image layer and the created read-only snapshot.

In at least one embodiment, creating a new read-only snapshot in the distributed block storage 130 using the data for a read-only image layer can comprise writing the data to a layered storage volume in the distributed block storage 130 and then creating a new read-only snapshot based on the data written to the layered storage volume. For example, the storage service 120 can create a new layered storage volume in the distributed block storage 130 and can write the data for the read-only image layer to a read-write storage layer of the layered storage volume. The storage service 120 can then create a read-only snapshot of the data stored in the layered storage volume's read-write storage layer. Optionally, the storage service 120 can create a new read-write storage layer for the layered storage volume and associate the new read-write storage layer with the created read-only snapshot.

In a scenario where an image manifest identifies more than one read-only image layer associated with an image, it is possible for one of the read-only image layers to be associated with a read-only snapshot in the distributed block storage 130 and for another of the read-only image layers to not be associated with a read-only snapshot. In such a scenario, the storage service 120 can create a new read-only snapshot for the read-only image layer that was not already associated with a read-only snapshot and associate the created read-only snapshot with the read-only snapshot that already existed.

For example, the storage service 120 can analyze a given image manifest and determine that the image manifest identifies two read-only image layers: a first read-only image layer and a second read-only image layer that is based on the first read-only image layer. The storage service 120 can ascertain that the first read-only image layer is associated with the read-only snapshot 144 in the distributed block storage 130, and that the second read-only image layer is not associated with a read-only snapshot in the distributed block storage 130. The storage service 120 can retrieve data for the second read-only image layer from a remote source (such as the third-party container image repository 160) and create the read-only snapshot 142 in the distributed block storage 130 using the data for the second read-only image layer. The storage service 120 can associate the read-only snapshot 142 with the read-only snapshot 144 to indicate that the read-only snapshot 142 is based on the read-only snapshot 144. The storage service can update the image layer—snapshot mappings 122 (and/or the image layer—snapshot mapping service 170) to indicate that the read-only snapshot 142 is associated with the second read-only image layer. Subsequently, the storage service 120 can create a layered storage volume based on an image that comprises the second read-only image layer using, at least in part, the read-only snapshot 142.

In a particular embodiment, the first read-only image layer can represent an operating system and the second read-only image layer can represent one or more applications and/or services installed on top of the operating system. In such an embodiment, the layered storage volume 132 based on the read-only snapshot 142 (containing the data for the one or more applications and/or services) and the read-only snapshot 144 (containing the data for the operating system) can be presented to the virtualization container 114 as a "flattened file system containing the data for the operating system and the one or more applications and/or services.

In an embodiment where the image manifest lists only one read-only image layer, the storage service 120 can identify a read-only snapshot in the distributed block storage 130 associated with the read-only image layer and associate a new virtual volume with the one read-only snapshot directly. In an embodiment where the image manifest lists multiple read-only image layers, the storage service 120 can attempt to identify a dependency (or lineage) relationship among the multiple read-only image layers. This can be done, for example, by analyzing information about the dependency (or lineage) relationships recorded in the image manifest. Additionally or alternatively, the storage service 120 can identify read-only snapshots associated with the multiple read-only image layers and the identified read-only snapshots can identify the dependency (or lineage) relationship among themselves. For example, a given read-only snapshot may indicate another read-only snapshot upon which it is based. That another read-only snapshot may, in turn, indicate a third read-only snapshot upon which it is based, and so on. Once the dependency (or lineage) relationship among the multiple read-only snapshots has been ascertained, the storage service 120 can associate the new virtual volume with a most recent of the read-only snapshots.

The virtualization container 114 can be used by the host operating system kernel 112 to execute one or more processes in isolation from other processes running on the host computer 110. The layered storage volume 132 in the distributed block storage 130 can be presented to the one or more processes running in the virtualization container 114 as a physical storage volume (not shown) mounted to a filesystem exposed within the virtualization container 114. In at least one embodiment, a process running in the virtualization container 114 can access the layered storage volume 132 as if it were a physical storage volume mounted directly to the host computer 110. When the process running in the virtualization container 114 attempts to access the mounted storage volume, the virtualization container 114 can transmit data accessed requests to the storage service 120, which can access the layered storage volume 132.

Optionally, the host computer 110 can comprise additional virtualization containers (e.g., 116) for running additional processes in isolation. In such an embodiment, the additional virtualization containers (e.g., 116) can also be configured to access the storage service 120 and to present different mounted volumes backed by other layered storage volumes (not shown) in the distributed block storage 130. The different virtual volumes in the distributed block storage, that are associated with different virtualization containers, can be associated with some or all of the same read-only snapshots stored in the distributed block storage.

In any of the examples described herein, a virtualization container can be a virtual runtime environment that groups and/or isolates one or more processes from other processes running on a host computer. A host computer can instantiate one or more virtualization containers associated with different processes. Unlike virtual machines, virtualization containers on a host computer share a same kernel of a host operating system. Technologies for creating virtualization containers are sometimes referred to as "operating system virtualization." Example virtualization technologies that can be used to implement virtualization containers include DOCKER libcontainer, LXC, OpenVZ, LINUX VServer, BSD Jails, SOLARIS zones, system-nspawn, libvirt-lxc, libvirt-sandbox, qemu/kvm, chroot, etc.

A virtualization container can be associate with resources of a host computer, such as memory, CPUs (or CPU cores), GPU, storage devices, network resources, etc. Constraints can be placed on a virtualization container's resource utilization. For example, an amount of the host computer's system resources (CPU, memory, network bandwidth, communication ports, storage capacity, etc.) that processes in a given virtualization container can use can be limited. In a scenarios where more than one virtualization container is instantiated on a given host computer, different system resource constraints can be applied to the different virtualization containers.

In any of the examples described herein, a storage device can be any device capable of storing data in one or more physical storage media. For example, a storage device can be a magnetic storage device, such as a hard disk drive. Other examples of storage devices include solid state storage devices (such as NAND-type flash devices and NOR-type flash devices), and random access data storage devices (such as DRAM devices).

In some embodiments, a storage device comprises a storage device controller configured to receive data access commands and perform read and write operations on the one or more physical storage media.

In any of the examples described herein, a remote storage device is a storage device that is not directly connected to a host computer on which a virtualization container is instantiated. A remote storage volume is a storage volume (such as a layered storage volume) that is stored on one or more remote storage devices.

In any of the examples described herein, a distributed storage can be a storage system comprising multiple storage devices. In at least some embodiments, data is stored redundantly across multiple storage devices in a distributed storage. In a scenario where data is stored redundantly, a given piece of data can potentially be retrieved from more than one storage device. In a different or further embodiment, data items stored in a distributed storage can be sharded. When a data item is sharded, it is divided into multiple pieces and the multiple pieces can be stored on separate storage devices in the distributed storage. A sharded data item can be retrieved by retrieving the shards from the multiple storage devices and assembling them to reform the data item. In at least one case, shards can be stored redundantly so that less than all of the storage devices on which shards for a given data item are stored are required to reassemble the data item.

In a different or further embodiment, a distributed storage can be a distributed block storage. In a distributed block storage, a data item can be separated into multiple data blocks and the data blocks can be stored across multiple storage devices. A data item can be retrieved by retrieving the data blocks and reforming the data item. In at least some cases, the data blocks for a given data item can be stored redundantly across multiple storage devices. In at least some embodiments, data blocks for data items are individually addressable and can be targeted by data access operations using their individual addresses. In a further embodiment, data blocks in a distributed block storage can be associated with logical addresses (such as logical block addresses (LBAs)) and physical addresses. In such an embodiment, data blocks can be accessed using their logical addresses, which are used to locate the physical addresses where the blocks are stored. In at least one case, where data blocks are stored redundantly, a logical address for a data block can be associated with multiple physical addresses representing the multiple locations where copies of the given data block are stored.

In at least some embodiments, a distributed storage can comprise a cache configured to provide faster access to frequently requested data items. In a distributed storage, read-only data snapshots and/or read-write storage layers associated with storage volumes can be stored on one or more storage devices, in whole or in part.

In any of the examples described herein, a host computer can be a server or other computing device that comprises a processor and is configured to communicate over a network. The host computer can be connected to one or more storage devices and can be configured to transmit data access requests (such as data read and write operation requests) to the one or more storage devices and receive responses from the one or more storage devices. The connection can be an indirect connection, such as a connection over a network. In scenarios where the host computer is connected to more than one storage device, the various connections can be of the same type or different types. In at least some embodiments, the host computer is configured to communicate with the one or more storage devices through a storage service. A host computer can further comprise memory, and/or one or more local storages. In at least one embodiment, a host computer can be a virtual machine and the system resources of the host computer (processor, memory, storage capacity, network interface, etc.) can be virtual resources exposed to the host computer (for example by a hypervisor). A host computer can be configured to instantiate one or more virtualization containers and to run one or more processes in the one or more virtualization containers.

Figure 2:
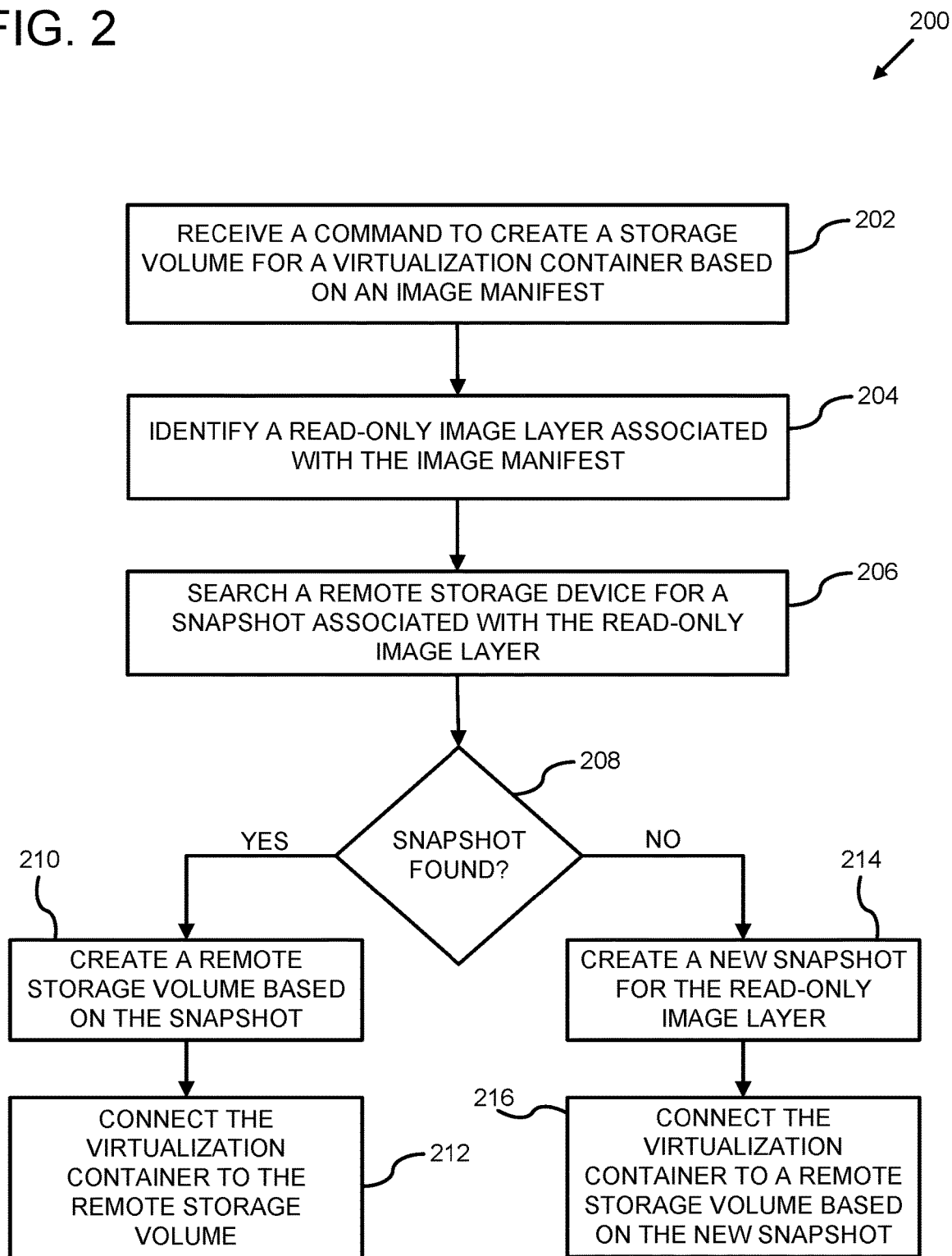
FIG. 2 is a flowchart of an example method for creating a storage volume for a virtualization container based on an image manifest.

FIG. 2 is a flowchart of an example method 200 for creating a storage volume for a virtualization container based on an image manifest. Any of the example systems described herein can be used to perform the example method 200. For example, all or part of the example method 200 can be performed by a storage service such as the storage service 120 depicted in FIG. 1. Alternatively or additionally, all or part of the example method 200 can be performed by a driver or other program on a host computer.

At 202, a command is received to create a storage volume for a virtualization container based on an image manifest. The command can comprise an identifier for the image manifest, such as an unique identifier associated with the image manifest in an image repository or image registry. The image manifest can be retrieved from the image repository or image registry using the provided identifier. Once the image manifest has been retrieved, contents of the manifest can be analyzed to identify one or more read-only image layers that make up a container image associated with the image manifest.

At 204, a read-only image layer associated with the image manifest is identified. In at least one embodiment, the image manifest comprises a list of identifiers for one or more read-only image layers that make up the associated container image. In such an embodiment, the read-only image layer can be identified by processing the list of read-only image layer identifiers. For example, the identified read-only image layer can be an image layer associated with a first of the identifiers in the list. In a scenario where the list of read-only image layer identifiers comprises more than one identifier, the identifiers can be organized in such a way as to reflect a dependency relationship between the associated read-only image layers. For example, the first identifier in the list can identify a base read-only image layer, and subsequent identifiers can identify read-only image layers that represent subsequent changes to, additions to, and/or deletions of data contained in previous layers (including the base layer and/or any intervening read-only image layers). Alternatively, a last identifier in the list can identify the base read-only image layer and the first identifier in the list can identify a most-recent set of changes to, additions to, and/or deletions of data contained in previous layers.

At 206, a remote storage device is searched for a snapshot associated with the identified read-only image layer. In one embodiment, the remote storage device stores one or more data files comprising mappings between read-only image layer identifiers and read-only snapshots stored in the remote storage device, wherein a mapping between a given read-only image layer identifier in a read-only snapshot indicates that the read-only snapshot stored on the remote storage device contains data for the read-only image layer. In such an embodiment, the one or more data files on the remote storage device can be searched for a mapping entry that contains an identifier for the identified read-only image layer. In a different or further embodiment, mappings between read-only image layer identifiers and read-only snapshots can be stored in a separate location, such as in a storage medium and/or memory of a server running a storage service.

In at least one embodiment, the remote storage device comprises multiple storage media organized in a distributed storage, such as a distributed block storage.

At 208, a check is made to see if the snapshot associated with the identified read-only image layer was found. If a snapshot associated with the read-only image layer was found on the remote storage device, then at 210 a remote storage volume is created based on the snapshot. Creating a remote storage volume can comprise creating a new read-write storage layer for the remote storage volume on the remote storage device and associating the new read-write storage layer with the snapshot. The association can comprise a relationship that indicates that the new read-write storage layer is based on the snapshot associated with the read-only image layer. At 212, the remote storage volume is connected to the virtualization container. Example technologies for connecting a remote storage volume to a virtualization container are described herein.

If a snapshot associated with the identified read-only image layer was not found, then at 214 a new snapshot is created in the remote storage device for the read-only image layer. Creating the new snapshot can comprise searching one or more third-party image registries and/or image repositories for the identified read-only image layer. If the read-only image layer is found in a third-party image registry or image repository, then data associated with the read-only image layer can be retrieved from the third-party image registry or image repository. Once the data for the read-only image layer is retrieved, a new snapshot can be created in the remote storage device using the retrieved data. Creating the new snapshot can comprise writing the data for the read-only image layer to one or more storage locations (such as one or more physical storage media, one or more data blocks on one or more physical storage media, etc.) in the remote storage device. In a different or further embodiment, creating the new snapshot can comprise creating a new mapping entry associating one or more storage locations where the data for the read-only image layer is stored in the remote storage device with the identifier for the read-only image layer. In a different or further embodiment, one or more storage locations where data for the read-only image layer is stored in the remote storage device can be marked as read-only to prevent the data from being modified by subsequent data operations.

At 216, the virtualization container is connected to a remote storage volume that is based on the new snapshot. In at least one embodiment, the virtualization container is created as part of the snapshot creation process. For example, a new remote storage volume can be created that is not based on any pre-existing snapshots. Such a remote storage volume can comprise a read-write storage layer on the remote storage device that is not based on a snapshot. Once data for the read-only image layer has been retrieved, the data can be written to the read-write storage layer of the remote storage volume. The new snapshot can be created, for example, by marking the read-write storage layer (or portions of the read-write storage layer that contain data for the read-only image layer) as read-only. Alternatively or additionally, locations in the read-write storage layer storing data for the read-only image layer can be associated with the identifier for the read-only image layer in a mapping entry. Optionally, a new read-write storage layer can be created for the remote storage volume, wherein the new read-write storage layer is based on the new snapshot. The remote storage volume can then be connected to the virtualization container.

In a scenario where the image manifest identifies more than one read-only image layer, snapshots can be located and/or created in the remote storage device for each of the read-only image layers. For example, a most-recent read-only image layer that is associated with a snapshot in the remote storage device can be identified. This can be done by attempting to identify snapshots for each of the read-only image layers, beginning with the oldest layer (e.g., the base layer), and stopping when a snapshot for a given read-only image layer is not found. Once the most recent read-only image layer that is associated with a snapshot has been identified, a remote storage volume can be created based on that snapshot. New snapshots can then be created in the remote storage device for read-only image layers for which snapshots are missing. This can be done, for example, by writing data for a read-only image layer to a read-write storage layer of the remote storage volume and then creating a snapshot of the remote storage volume. This process can be repeated for any remaining read-only image layers identified by the image manifest. Once snapshots have been identified or created for each of the read-only image layers identified in the image manifest, the remote storage volume can be connected to the virtualization container.

In at least one embodiment, data for read-only image layers can be retrieved from multiple different image registries and/or image repositories. For example, data for a first read-only image layer can be retrieved from a first image registry and/or image repository and used to create a first snapshot. Then data for a second read-only image layer can be retrieved from a second, different image registry and/or image repository and can be used to create a second snapshot that is based on the first snapshot.

At least one embodiment of the technologies described herein comprises a method for creating a new image based on a remote storage volume connected to a virtualization container. Such a method can be performed using any of the example systems described herein.

In an example method for creating a new image based on a remote storage volume, a command can be received to create a new image for a virtualization container. The command can be received from the virtualization container or a process running inside the virtualization container.

Additionally or alternatively, the command can be received from a separate service configured to monitor and/or perform maintenance operations on the virtualization container. A snapshot can be created of a remote storage volume connected to the virtualization container. The remote storage volume can be a layered storage volume stored on one or more remote storage devices connected to a host computer where the virtualization container is instantiated. The remote storage volume can be connected to the host computer via one or more network connections. The remote storage volume can be a virtual volume in a distributed storage, such as a distributed block storage.

Creating a snapshot of the remote storage volume can comprise creating a read-only copy of data stored in the remote storage volume. In an embodiment where the remote storage volume is a layered storage volume, creating the snapshot can comprise identifying differences between the layered storage volume and another snapshot on which the layered storage volume is based. Once such differences are identified, the differences can be stored in the created snapshot. The created snapshot can then be associated with the another snapshot, such as with a relationship that indicates that the created snapshot is based on the another snapshot.

In at least one embodiment, the remote storage volume comprises a reference to a read-only snapshot and data read requests directed to remote storage volume are serviced by retrieving data from the read-only snapshot. In such an embodiment, when a data write request is received, such as from a process executing in the virtualization container, a read-write storage layer can be created in the remote storage volume and data contained in the data write request can be written to the read-write storage layer. In such an embodiment, determining differences between the remote storage volume and the snapshot on which the remote storage volume is based can comprise identifying the date written to the read-write storage layer and storing a read-only copy of the identified data in the created snapshot.

The created snapshot can be stored in a remote storage device. The remote storage device can be the same remote storage device on which the remote storage volume is stored. In an embodiment where the remote storage volume is a layered storage volume based on one or more other read-only snapshots, the created snapshot can be stored on a same storage device as the other one or more read-only snapshots. Additionally or alternatively, the created snapshot can comprise multiple data blocks that are stored on multiple different storage devices in a distributed block storage.

The created snapshot can be registered as a new image with an image repository.

Registering the created snapshot can comprise generating an image manifest that identifies the created snapshot as a basis for a new container image and transmitting the generated image manifest to the image repository. In an embodiment where the remote storage volume is a layered storage volume based on one or more other read-only snapshots, the generated image manifest can identify the created snapshot, the one or more other snapshots, and a relationship between the created snapshot and the one or more other snapshots. For example, the image manifest can indicate that the created snapshot is based on one of the one or more other snapshots and comprises changes and/or additions to data stored in the one of the one or more other snapshots. The image manifest can also identify similar relationships between the one or more other snapshots. By analyzing such relationships, a service wishing to create a new volume using the image manifest can create a dependency (or lineage) graph of the related snapshots and associate the new volume with a most recent of the snapshots.

Figure 3:
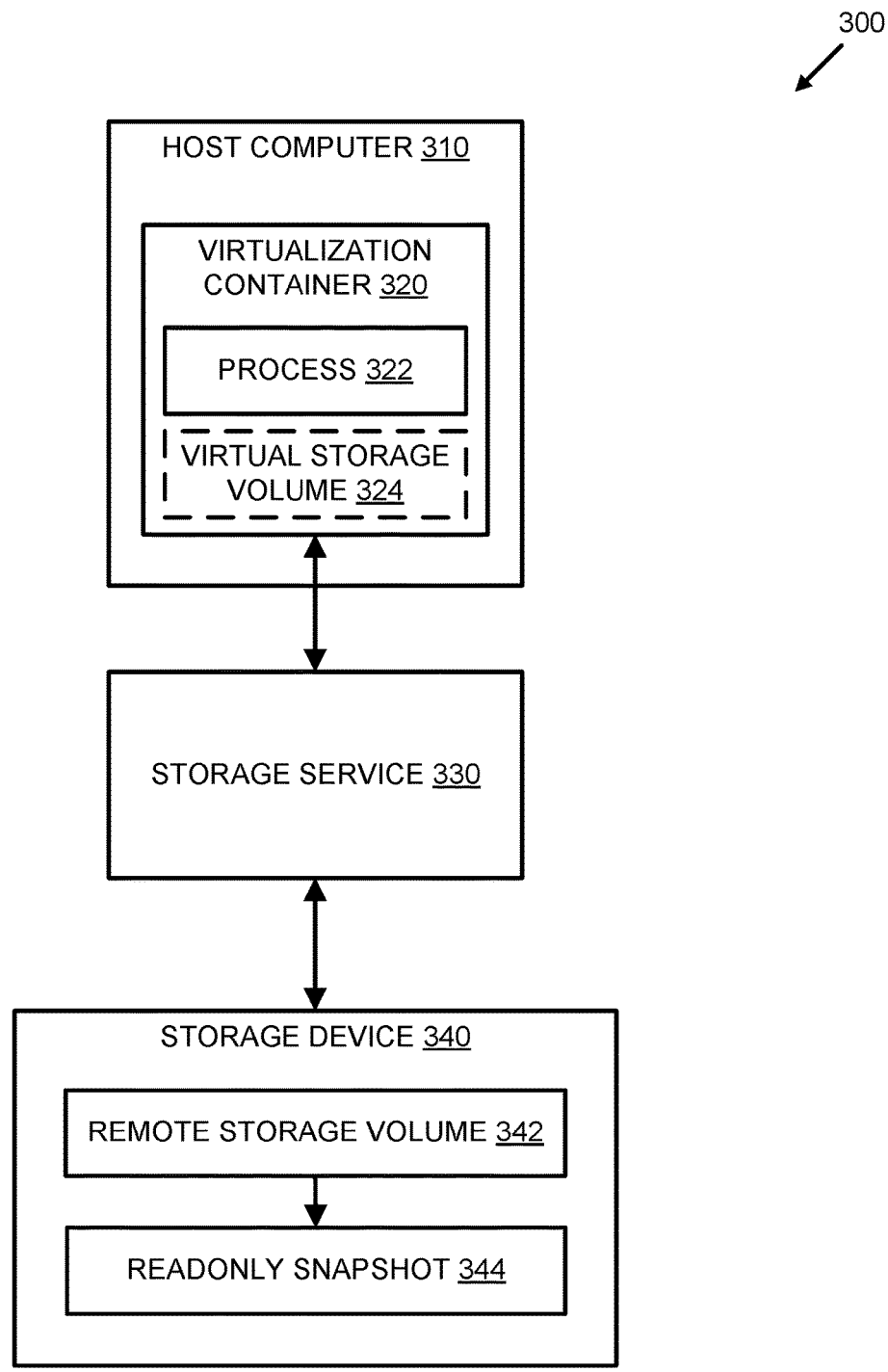
FIG. 3 is a system diagram showing an example system comprising a virtualization container configured to present a virtual storage volume backed by a layered remote storage volume.

FIG. 3 is a system diagram showing an example system 300 comprising a virtualization container 320 configured to present a virtual storage volume 324 to a process 322, wherein the virtual storage volume 324 is backed by a layered remote storage volume 342 in a storage device 340. The virtualization container 320 is configured to execute the process 322 in isolation from other processes (not shown) executing on the host computer 310 and to present the virtual storage volume 324 to the process 322 as a physical storage volume connected to the virtualization container 320. Presenting the virtual storage volume 324 to the process 322 as a physical storage volume can comprise reporting the virtual storage volume 324 to the process 322 as a mounted storage volume and/or allowing the process 322 to detect the virtual storage volume 324 as a mounted storage volume, and allowing the process 322 to access the virtual storage volume as if it were a mounted storage volume. The virtualization container 320 is configured to receive data access requests targeting the virtual storage volume 324 from the process 322 and to transmit data access requests to a storage service 330 that is separate from the host computer 310, in order to access data stored in the remote storage volume 342.

The storage service 330 is configured to receive the data access requests from the virtualization container 320 and to access the remote storage volume 342 on the storage device 340 over a network. The remote storage volume 342 is a layered storage volume associated with one or more read-only data snapshots, such as read-only snapshot 344. The storage service 330 is further configured to process the data access requests using the read-only data snapshot 344. Although only a single read-only snapshot 344 is depicted, the remote storage volume 342 can be based on more than one read-only snapshot.

In a particular example, the process 322 can request data from the virtual storage volume 324. The virtualization container 320 can transmit one or more data read requests to the storage service 330 to retrieve the requested data from the remote storage volume 342. The storage service 330 can analyze the read-only snapshot 344 associated with the remote storage volume 342 and determine that at least part of the requested data is stored in the read-only snapshot 344. The storage service 330 can then retrieve the at least part of the requested data from the read-only snapshot 344 and transmit it back to the virtualization container 320. Upon receipt of the at least part of the requested data, the virtualization container 320 can provide the at least part of the requested data to the process 322 as if it was retrieved from the virtual storage volume 324.

In another particular example, the process 322 can request that additional data be written to the virtual storage volume 324. In response, the virtualization container 320 can transmit one or more data write requests to the storage service 330. The storage service 330 can create a read-write storage layer associated with the remote storage volume 342. The storage service 330 can store the read-write storage layer in the storage device 340 or in another storage device (not shown). In at least one embodiment, the storage device 340 is part of a distributed storage comprising multiple storage devices. In such an embodiment, the storage service 330 can store different parts of the read-write storage layer in multiple storage devices in the distributed storage. The storage service 330 can then write data contained in the one or more data write requests to the read-write storage layer.

Optionally, after writing the data to the read-write storage layer associated with the remote storage volume 342, the storage service 330 can transmit a write confirmation message to the virtualization container 320. The confirmation message can comprise one or more logical addresses associated with the read-write storage layer at which the data was written. The virtualization container 320 can present the one or more logical addresses to the process 322 as logical addresses within the virtual storage volume 324 at which the data was written.

In another particular example, the process 322 can request that data stored in the virtual storage volume 324 be modified and/or deleted. The virtualization container 320 can transmit one or more data write requests to the storage service 332 modify and/or delete the identified data.

In the case of the data modification, the storage service 330 can copy the identified data from the read-only snapshot 344 into a read-write storage layer associated with the remote storage volume 342 and then modify the copy of the data. For example, the storage service 330 can identify a data block in the read-only snapshot 344 that is a target of a data write request and copy the contents of the targeted data block into a new data block in the read-write storage layer associated with the remote storage volume 342. The storage service 330 can then make any changes requested by the data write request to the contents of the data block in the read-write storage layer. The data in the read-write storage layer can be associated with a logical address that was previously associated with the unmodified data in the read-only snapshot. Subsequent data access requests targeting the logical address can be handled by the storage service 330 using the modified copy of the data in the read-write storage layer instead of the unmodified version of the data in the read-only snapshot 344.

In the case of a deletion, the storage service 330 can identify data in the read-only snapshot 344 that is a target of the deletion and identify one or more logical addresses associated with the targeted data in the read-only snapshot 344. The storage service 330 can then create a deletion flag (also referred to as a "white-out mark") in a read-write storage layer associated with a remote storage volume 342 and associate the deletion flag with the one or more identified logical addresses. Subsequent data access requests targeting the one or more logical addresses can be handled by the storage service 330 by locating the deletion flag in the read-write storage layer and returning a message to the virtualization container 320 indicating that the requested data has been deleted.

Data written to a read-write storage layer of the remote storage volume 342 (and any deletion flags) can be used by the storage service 330 to create a new snapshot. The new snapshot (and its dependency upon the read-only snapshot 344) can be registered as a new container image from which the virtualization container 320 (or a different virtualization container) can create a new virtual storage volume.

Figure 4:
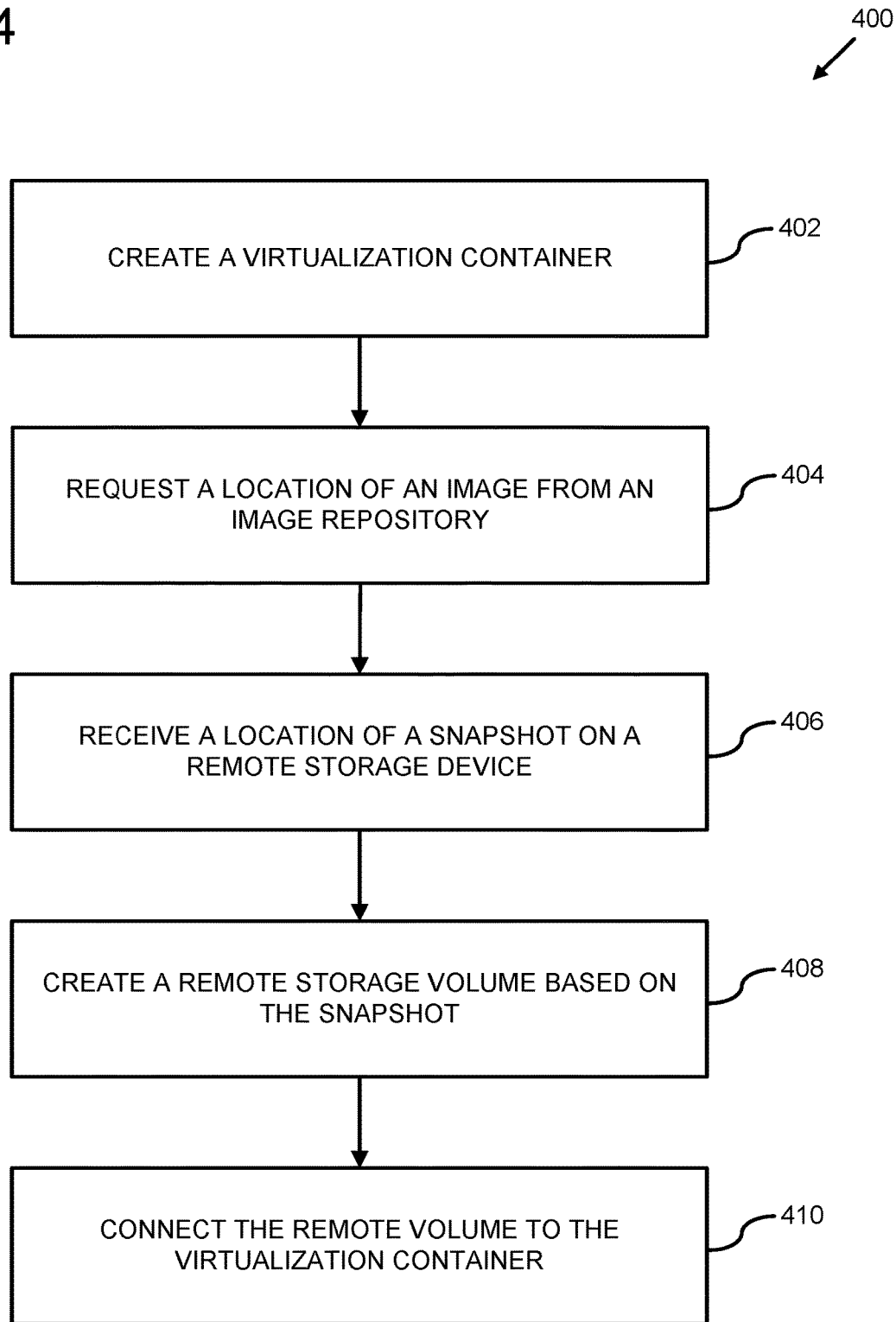
FIG. 4 is a flowchart of an example method for creating a virtualization container connected to a remote storage volume.

FIG. 4 is a flowchart of an example method 400 for creating a virtualization container connected to a remote storage volume. Any of the example systems described herein can be used to perform example method 400. At 402, a new virtualization container is created on a host computer. Creating the new virtualization container can comprise instantiating the virtualization container and identifying a container image that should be used as the basis for a new storage volume attached to the virtualization container. At 404, a location of the container image is requested from an image repository. The image repository can be an image repository server, an image repository service running on a server, or the like. It image repository can be configured to receive requests for container images and transmit locations of snapshots forming the basis of the requested container images in response.

At 406, a location of a snapshot on a remote storage device is received from the image repository. In at least one embodiment, an image snapshot manifest associated with the requested container image is received from the image repository. The image snapshot manifest can identify one or more snapshots associated with the image container and locations of the one or more snapshots on remote storage devices. In different or further embodiment, a location or locations of one or more data blocks associated with one or more read-only snapshots in a distributed block storage can be received.

At 408, a remote storage volume based on the one or more snapshots associated with the image container is created. In at least one embodiment, the remote storage volume comprises a read-write storage space associated with the one or more snapshots. The remote storage volume can be associated with an identifier that can be used to uniquely identify the remote storage volume for subsequent data access requests. At 410, the remote storage volume is connected to the virtualization container. The connection can comprise transmitting the identifier for the remote storage volume to the virtualization container and retaining the identifier by the virtualization container for use in subsequent data access requests. In at least one embodiment, the remote storage volume can be presented to one or more processes executing in the virtualization container as a mounted storage volume. Data access operations targeting the mounted storage volume can then be tunneled by the virtualization container to the remote storage volume.

In a different or further embodiment, data access requests for the remote storage volume comprise the remote storage volume's identifier and are transmitted by the virtualization container to a storage service. The storage service can use the identifier of the remote storage volume to identify the one or more snapshots (and optionally a read-write storage space) associated with the remote storage volume in the remote storage device. Using techniques described herein, the storage service can perform the requested data access operations using the identified one or more snapshots (and optionally the identified read-write storage space).

Figure 5:
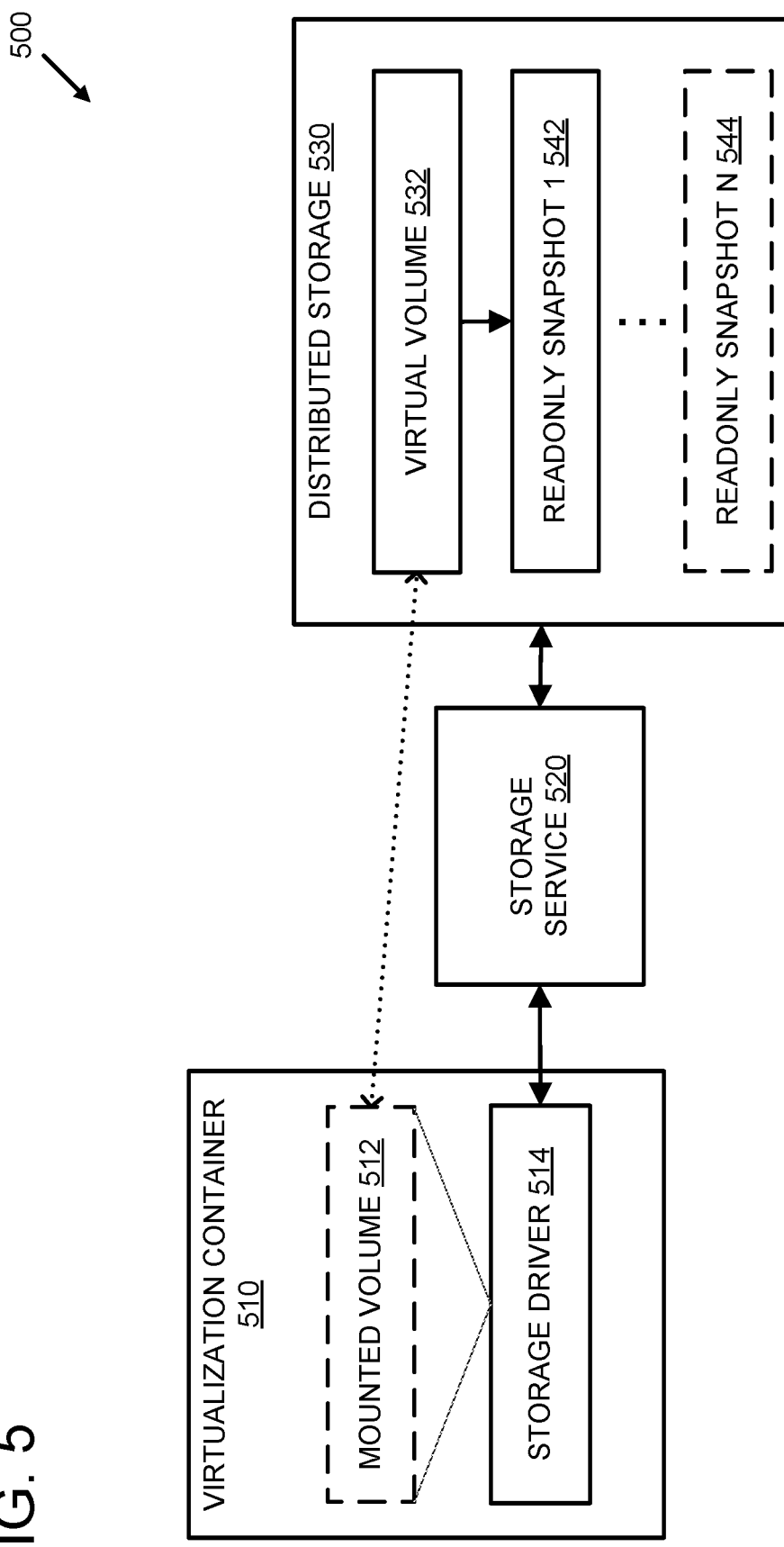
FIG. 5 is a system diagram showing an example system configured to present a mounted volume to a virtualization container based on a layered virtual volume in a distributed storage.

FIG. 5 is a system diagram showing an example system 500 configured to present a mounted volume 512 to one or more processes (not shown) in a virtualization container 510, wherein the mounted volume 512 is based on a layered virtual volume 532 in a distributed storage 530. The virtualization container 510 comprises a storage driver 514 configured to communicate with a storage service 522 to access the virtual volume 532 in the distributed storage 530, and to present the representation of the mounted volume 512 within the virtualization container 510. The storage driver 514 can be a driver associated with an operating system of a host computer (not shown) that instantiated the virtualization container 510. In a different or further embodiment, the storage driver 514 can be a special-purpose driver used to allow a process running in the virtualization container 510 to interact with a layered storage volume. For example, from the perspective of a process executing in the virtualization container 510, the mounted volume 512 represented by the storage driver 514 can appear to be a physical volume connected to the host computer. In such an embodiment, the storage driver 514 can mask the fact that the process running in the virtualization container 510 is interacting with the layered virtual volume 532 in the distributed storage 530.

The distributed storage 530 comprises multiple storage devices. The storage service 520 is configured to store data across the multiple storage devices in the distributed storage 530 and to present a unified view of the data stored in the distributed storage 530 to the storage driver 514. For example, the storage service 520 can present a unified view of the storage capacity of the multiple storage devices in the distributed storage 530. From the perspective of the storage driver 514, the distributed storage 530 can appear to be a single filesystem or storage space. When the storage service 520 writes data to the distributed storage 530, the storage service can write different chunks of the data (such as data blocks) to different storage devices in the distributed storage 530. When the storage service 520 processes a request for data stored in the distributed storage 530, the storage service 520 can locate the chunks of the requested data stored on the multiple storage devices, retrieve the chunks from the storage devices, and reassembled the requested data before transmitting the requested data back to the requester.

The storage service 520 is further configured to process data access requests received from the storage driver 514 using the virtual volume 532 in the distributed storage 530. The virtual volume 532 is associated with a read-only snapshot 542. When a data access request is received from the storage driver 514, the storage service 520 can identify the virtual volume 532 associated with the storage driver 514 and process the data access request using the read-only snapshot 542 associated with the virtual volume 532. In at least one embodiment, the virtual volume 532 is associated with multiple read-only snapshots 542-544. In such an embodiment, the read-only snapshots 542-544 constitute multiple layers of data in which each successive snapshot stores additions, modifications, and/or deletions to data stored in the previous snapshot. In such an embodiment, the storage service 520 is configured to process a data access request received from the storage driver 514 by identifying the most recent snapshot in which the requested data stored. For example, the data access request can comprise a logical address associated with requested data. The storage service 520 can identify a most recent snapshot associated with the virtual volume 532 that contains one or more data locations associated with the logical address. The storage service 520 can be configured to do this, for example, by starting with the read-only snapshot 542, upon which the virtual volume 532 is directly based, and moving down through the layers of read-only snapshots until one or more data locations associated with the logical address is identified. In a different or further embodiment, the storage service 520 can comprise metadata about the read-only snapshots 542-544 associated with the virtual volume 532. The metadata can comprise associations between logical data addresses and read-only snapshots. In such an embodiment, the storage service can inspect the metadata to identify a read-only snapshot associated with the logical address without inspecting the read-only snapshots in the distributed storage 530 directly.

The storage driver 514 can allow a process executing in the virtualization container 510 to interact with the mounted volume 512 as if it were a flat filesystem or storage space connected directly to the host computer containing the virtualization container 510, when in fact the storage driver 514 tunnels all data access requests from the process to the storage service 520 which then processes the data access requests using the virtual volume 532 in the distributed storage 530.

Figure 6:
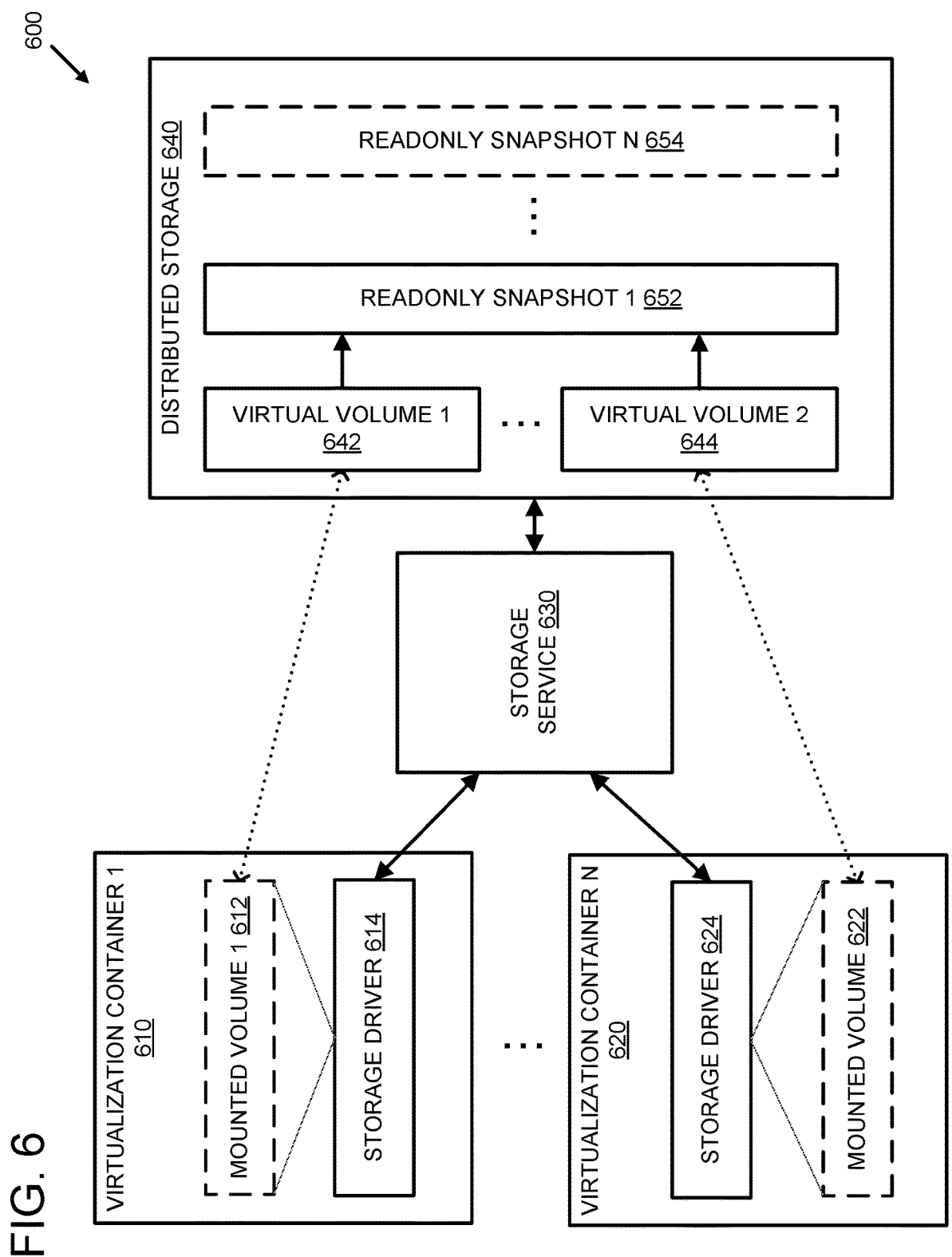
FIG. 6 is a system diagram showing an example system comprising multiple virtualization containers with mounted volumes backed by different virtual volumes in a distributed storage.

FIG. 6 is a system diagram showing an example system 600 comprising multiple virtualization containers 610-620 with mounted volumes 612-622 backed by different virtual volumes 642-644 in a distributed storage 640. The virtualization containers 610-620 can be instantiated on different host computers. For example, the virtualization container 610 can be instantiated on a first host computer and the virtualization container 620 can be instantiated on a second host computer. Additionally or alternatively, multiple of the virtualization containers 610-620 can be instantiated on one host computer.

The virtualization container 610 comprises a storage driver 614 that represents a mounted volume 612 to one or more processes (not shown) executing in the virtualization container 610 that is backed by the virtual volume 642 in the distributed storage 640. The virtualization container 620 comprises a storage driver 624 that represents a mounted volume 622 to a second one or more processes (not shown) executing in the virtualization container 620 that is backed by the virtual volume 644.

A storage service 630 is configured to receive data access requests from the storage drivers 614-624 and to process the data access requests using virtual volumes 642-644 in the distributed storage 640. The storage driver 630 can determine which virtual volume of the virtual volumes 642-644 should be used to process a given data access request received from a storage driver (e.g. 614 are 624). For example, a data access request can comprise a virtual volume identifier associated with a virtual volume of the virtual volumes 642-644. The storage service can identify the virtual volume using the identifier accompanying the data access request and then use the identified virtual volume to process the data access request.

The virtual volumes 642-644 are layered virtual volumes associated with one or more read-only snapshots (e.g., 652) stored in the distributed storage 640. Since the virtual volumes 642-644 depend on a same one or more read-only snapshots 652-654, the mounted volumes 612-622 represented by the storage driver 614-624 can represent a same initial data state to processes executing in the separate virtualization container 610-620. However, additions, modifications, and/or deletions for the different virtual volumes 642-644 will be recorded separately in the distributed storage 640 by the storage service 630. Thus, as processes in the different virtualization containers 610-620 request alterations or additions, the data states of their respective virtual volumes 642-644 can begin to diverge.

In at least one embodiment, the storage service 630 can record additions, modifications and/or deletions for a given virtual volume, of the virtual volumes 642-644, by creating a separate read-write storage layer for the given virtual volume in the distributed storage 640. In a particular example, the storage service 630 receives a data access request from the storage driver 614 to add data to the virtual volume 642. Responsive to receiving the data access request, the storage service 630 can identify the virtual volume 642 associated with the virtualization container 610 and attempt to locate a read-write storage layer for the virtual volume 642 in the distributed storage 640. If the storage service 630 cannot locate a read-write storage layer for the virtual volume 642, the storage service 630 can create a new read-write storage layer in the distributed storage 640 and associate it with the virtual volume 642. The storage service 630 can then write data contained in the request to add data to the read-write storage layer associated with the virtual volume 642. A subsequent data access request to read the data added by the add data request can be processed by the storage service 630 by retrieving the added data from the read-write storage layer associated with the virtual volume 642. However, a subsequent data access request to read data that was not added by the data had request can be processed by the storage service 630 by retrieving the data from the one or more read-only snapshots 652-654.

In another particular example, the storage service 630 can receive a data access request from the storage driver 624 to modify data. The storage service 630 can identify the virtual volume 644 associated with the virtual container 620 and determine whether or not a read-write storage layer stored in the distributed storage 640 is associated with the virtual volume 644. If a read-write storage layer is not already associated with the virtual volume 644, the storage service 630 can create a new read-write storage layer in the distributed storage 640 and associate it with the virtual volume 644. The storage service 630 can identify one or more data storage locations in the one or more read-only snapshots 652-654 associated with the virtual volume 644 that contain the data to be modified. The storage service 630 can then copy the data to be modified from the one or more read-only snapshots 652-654 into the read-write storage layer associated with the virtual volume 644. The storage service 630 can then modify the data according to the data access request. A subsequent data access request for the modified data can be processed by the storage service 630 by retrieving the modified data from the read-write storage layer associated with the virtual volume 644. However, a subsequent data access request for the same data locations received from the storage driver 614 will be processed by the storage service 630 using the virtual volume 642, with which the previous data modification request was not processed. Thus, the subsequent data access request from the storage driver 614 will be processed by the storage service 630 by retrieving the unmodified data from the one or more locations in the one or more read-only snapshots 652-654.

Although the virtual volumes 642-644 are depicted as being based on the same one or more read-only snapshots 652-654, it is also possible for virtual volumes to be based on some, but not all, of the same read-only snapshots. For example, a different virtual volume (not shown) may be based on the read-only snapshot 654 but not the read-only snapshot 652. Additionally or alternatively, the different virtual volume may be based on another read-only snapshot (not shown) on which the virtual volumes 642-644 are not based.

Figure 7A:
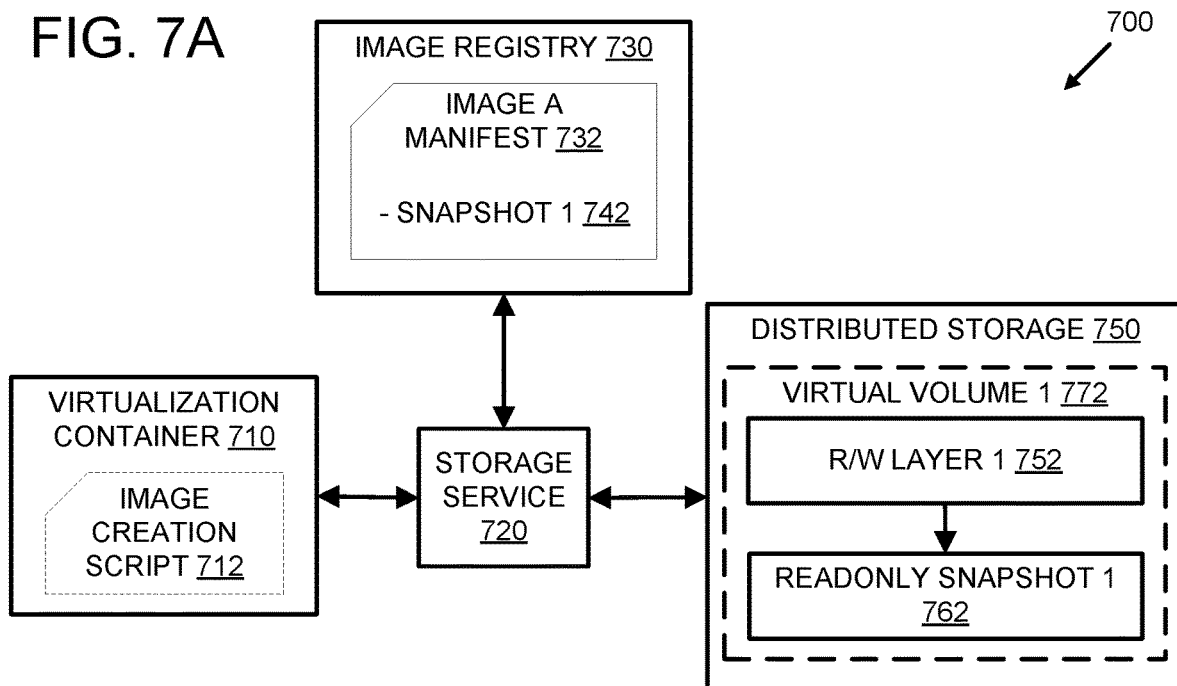
FIG. 7A is a system diagram showing an example system 700 comprising a virtualization container connected to a virtual volume based on an image manifest.

FIG. 7A is a system diagram showing an example system 700 comprising a virtualization container 710 connected to a virtual volume 772 in a distributed storage 750 based on an image manifest 732. The image manifest 732 comprises a single entry 742 indicating that the image A associated with the manifest 732 is based on a single read-only snapshot 762 stored in the distributed storage 750. The virtualization container 710 is connected to the storage service 720 and is configured to use storage service for creating and accessing virtual volumes in the distributed storage 750. For example, the virtualization container 710 can transmit a request to the storage service 720 to create a new virtual volume for the virtualization container 710 based on the image A. The storage service 720 is configured to retrieve the manifest 732 for the image A from an image registry 730 and to analyze the manifest 732 to the snapshot 762 in the distributed storage 750 associated with the image A. The storage service 720 is configured to create a new read-write layer 752 in the distributed store 750 that is based on the read-only snapshot 762 and to associate the read-write layer 752 with a new the virtual volume 772.

The virtualization container 710 can request data from the storage service 720. Upon receipt of such a request, the storage service 720 can identify the virtual volume 772 associated with the virtualization container 710 and process the request using data stored in the read-only snapshot 762 associated and/or the read-write layer 752.

The virtualization container 710 can transmit requests to change data (e.g., to add, modify, and/or delete data) to the storage service 720. The storage service 720 can process the requests to change data using the read-write layer 752. The storage service 720 can process a request to add new data by writing the new data to the read-write layer 752 in the distributed storage 750. The storage service 720 can process a request to modify data by copying the data to be modified from the read-only snapshot 762 into the read-write layer 752 and then modifying the copy in the read-write layer 752. The storage service 720 can process a request to delete data by identifying one or more locations in the read-only snapshot 762 where the data to be deleted to stored and to mark those locations in the read-write layer 752 as deleted.

Once a virtualization container 710 has changed data via one or more data requests, a new image can be created based on the changes.

Figure 7B:
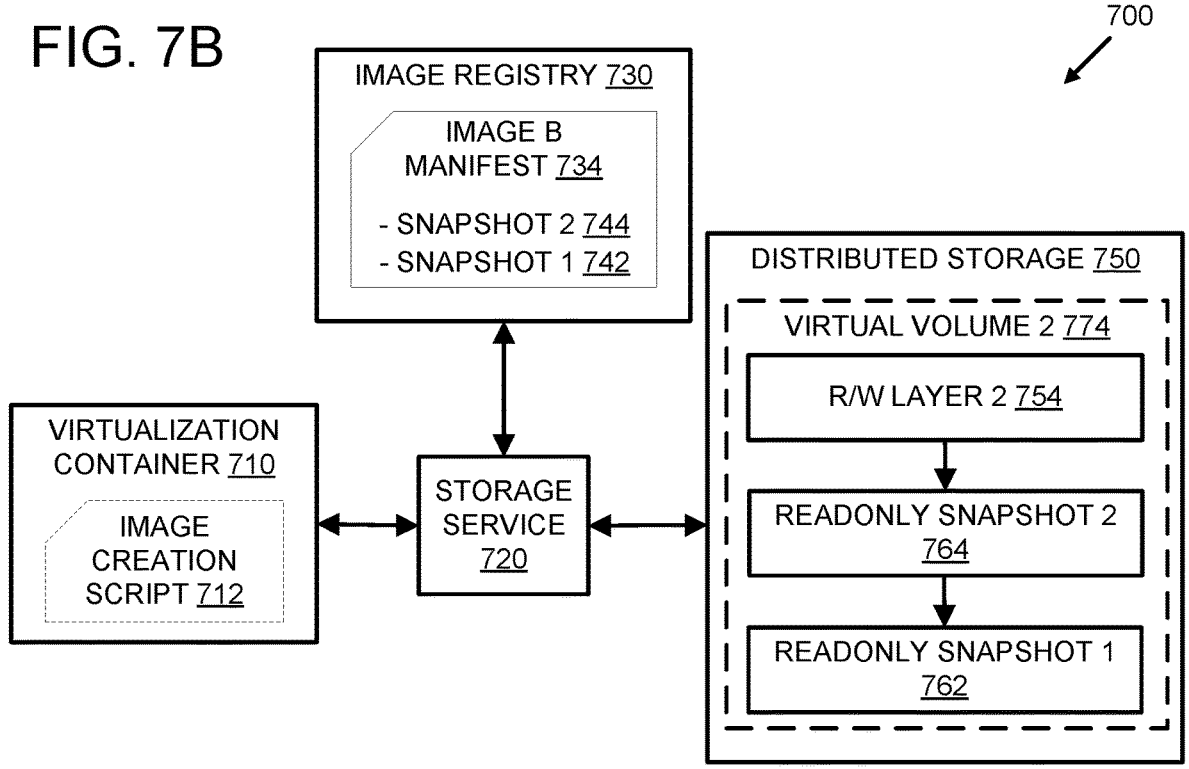
FIG. 7B is another system diagram showing the example system 700 comprising a new image manifest based on changes made by the virtualization container.

FIG. 7B is another system diagram showing the example system 700 comprising a new image manifest 734 based on changes made by the virtualization container 710. The virtualization container 710 can transmit a request to the storage service 720 to create a new virtual volume 774 based on changes in the virtual volume 772 currently associated with the virtualization container 710. Upon receipt of the request to create a new volume 774, the storage service 720 can create a new snapshot 764 of the changes stored in the read-write layer 752. For example, storage service 720 can make a read-only copy of data stored in the read-write layer 752 and store the read-only copy in the distributed storage 750 as the read-only snapshot 764. In another example, storage service 720 can convert the read-write layer 752 to the read-only snapshot 764 by marking it as read-only and preventing additional data changes from being applied to it. The storage service 720 can generate a new manifest 734 comprising a list of snapshots 744-742 indicating that a new image B is based on the read-only snapshot 764, which in turn is based on the read-only snapshot 762. The storage service 720 can associate the virtualization container 710 with a new virtual volume 774 based on the new image B by creating a new read-write layer 754 in the distributed storage 750 that is based on the read-only snapshot 764.

The image registry 730 can be configured to receive the new image manifest 734 from the storage service 720 and to store the manifest 734 in association with an identifier (e.g., "Image B") for the new image. The virtualization container 710 (or another virtualization container) can then request the creation of a new virtual volume (e.g., 774), at least in part, by providing the identifier for the new image to the storage service 720.

The virtualization container 710 can transmit a request to the storage service 720 to access data in the new virtual volume 774. The storage service 720 can process the request by searching the read-only snapshot 764 and/or the read-only snapshot 762 for the requested data. Additionally or alternatively, the virtualization container 710 can request subsequent changes to the data in the new virtual volume 774. The storage service 720 can process the subsequent changes using the new read-write layer 754.

Optionally, the virtualization container 710 can comprise an image creation script 712 that can be used by the virtualization container 710 to perform one or more data change operations in order to generate one or more new read-only snapshots in the distributed storage 750 and to create a new image based on the generated snapshots.

Figure 8:
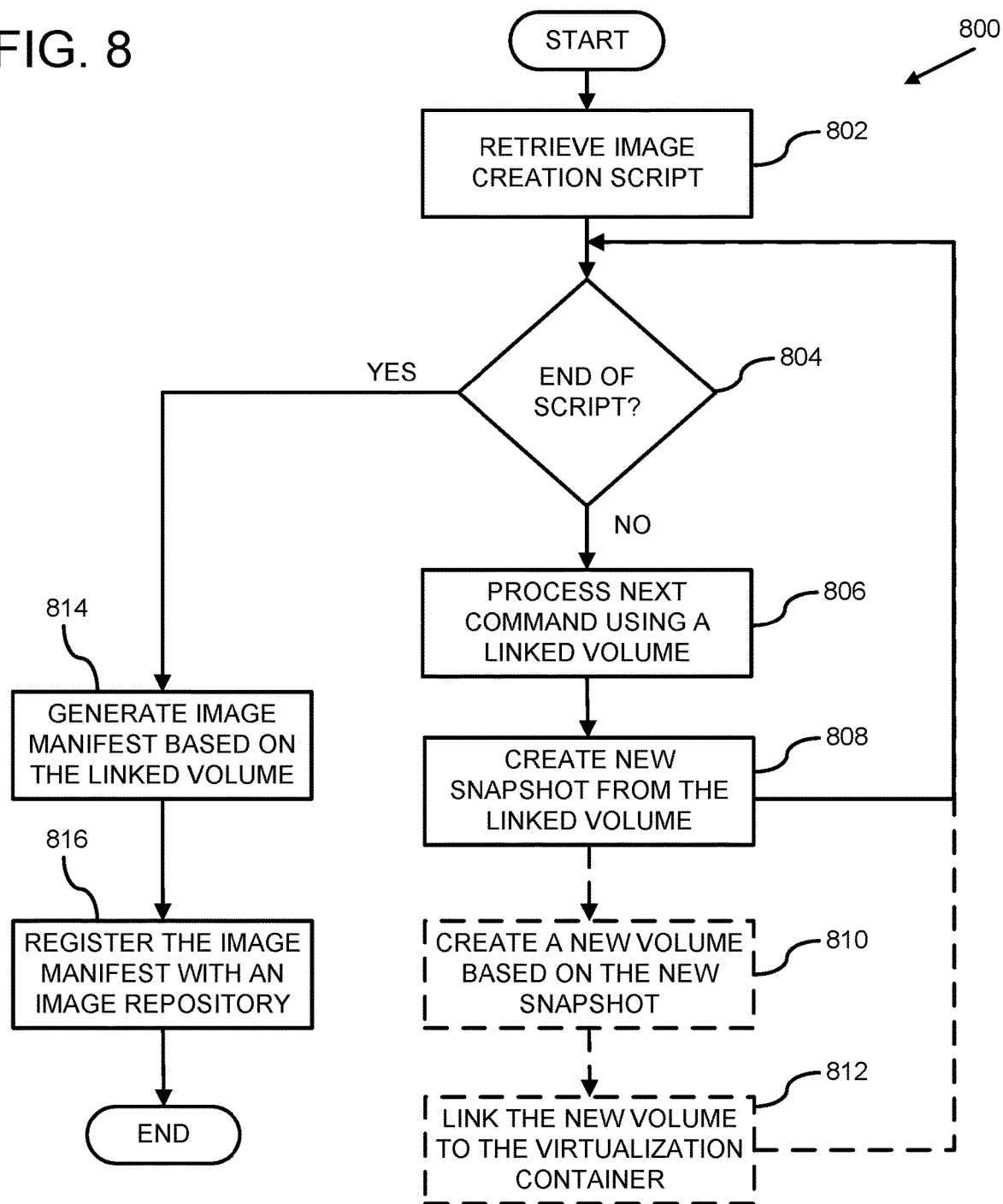
FIG. 8 is a flowchart of an example method for creating a remote image using layers of snapshots in a remote storage.

FIG. 8 is a flowchart of an example method 800 for creating a remote container image using layers of snapshots in a remote storage. At 802, an image creation script is retrieved. The image creation script comprises a series of commands that, when executed, will generate changes to data stored in a target storage volume. The image creation script can be executed by a process running inside a virtualization container. In one embodiment, the image creation script can be retrieved by the process running inside the virtualization container and then executed by that process. Alternatively or additionally, the path to the image creation script can be passed to a container management process that then creates the virtualization container, launches the process within the virtualization container, and instructs the launched process to execute the image creation script. The image creation script can be a file stored in a filed system, a data stream, or the like. Separate commands within the image creation script can be separated by one or more delimiters (such as line breaks) and the executing process can detect the end of one command and the beginning of another command by detecting the one or more delimiters.

At 804, a check is made to see if the end of the image creation script has been reached. If the end of the image creation script has not been reached, then at 806 the next command in the image creation script is processed using a storage volume linked to the virtualization container. The linked storage volume can be a remote storage volume that is accessed by the virtualization container over a network. In at least one embodiment, the virtualization container accesses the linked storage volume by transmitting one or more data access requests to a storage service. The storage service, upon receipt of a data access request from the virtualization container, can process the data access request by accessing data in the remote storage volume.

The remote storage volume can be a layered storage volume based on one or more read-only snapshots. The remote storage volume can be stored in one or more storage devices. In at least one embodiment, the remote storage volume comprises data stored across multiple storage devices organized in a distributed storage. In such an embodiment, a storage service can be configured to access the data of the remote storage volume stored across the multiple storage devices and present a unified representation of the remote storage volume to the virtualization container.

The process running in the virtualization container can process the current command in the image creation script. The command can comprise one or more computational operations and/or one or more data access requests targeting the linked storage volume. Example commands can include commands to format a filesystem in the linked storage volume; commands to create, modify, and/or delete files and/or folders stored in the linked storage volume; commands to download and install new applications and/or program modules in the linked storage volume; etc.

As part of processing the current command, one or more data access operations are performed on the linked storage volume. Operations that add, modify, and/or delete data in the linked storage volume can be performed by adding and/or modifying data in a read-write storage layer associated with the linked storage volume.

At 808, a new snapshot is created from the linked storage volume. Creating the new snapshot can comprise making a read-only copy of data stored in a read-write storage layer associated with the linked storage volume. Creating the new snapshot can comprise storing the read-only copy in one or more storage devices. Alternatively or additionally, creating the new snapshot can comprise marking the existing read-write storage layer as read-only and preventing additional additions and/or modifications from being made to the data stored within it. If the linked volume was based on another snapshot, then an association between the new snapshot and the another snapshot, indicating that the new snapshot is based on the another snapshot, can also be recorded.

A new read-write storage layer can then be associated with the linked volume, which is based on the newly created snapshot. Control can then return to step 804 to determine if any additional commands remain in the image creation script.

Optionally, instead of associating a new read-write storage layer with the existing linked volume, at 810, a new storage volume can be created based on the new snapshot. Creating the new storage volume can comprise creating a new read-write storage layer in one or more storage devices and creating an association between the new read-write storage layer and the new snapshot, indicating that the new storage volume is based on the new snapshot. At 812, the new storage volume can be linked to the virtualization container. Linking the new storage volume to the virtualization container can comprise removing the link between the previous storage volume and the virtualization container, and creating a new association between the new storage volume and the virtualization container. In at least one embodiment, the previous storage volume can be deleted (or marked as deleted) after the link between it and the virtualization container has been removed. After the new volume is linked to the virtualization container, control returns to step 804 to determine if the end of the image creation script has now been reached.

If the script contains more commands to be processed, steps 806-808 (or optionally steps 806-812) are repeated for each remaining command. Thus, a new snapshot can be created for each command in the image creation script.

Once the end of the image creation script has been reached, at 814 an image manifest is generated based on the linked storage volume. Generating the image manifest can comprise identifying the snapshots on which the linked storage volume is based. This can comprise identifying the snapshots that were created by processing the commands in the image creation script. If the storage volume that was initially linked to the virtualization container was based on one or more pre-existing snapshots, then the pre-existing snapshots can be identified as well. The image manifest can comprise a list of the identified snapshots. In at least one embodiment, the image manifest further comprises a record of the dependent (or lineage) relationships between the snapshots. In a different or further embodiment, the image manifest can provide a file location for each snapshot in one or more remote storage devices. In this way, the snapshots stored in one or more remote storage volumes can form the basis of a remote container image.

At 816, the image manifest is registered with an image repository. The registering can comprise transmitting the image manifest to an image repository service running a separate server. A virtualization container can request that a virtual volume based on the registered image manifest be mounted to it. A storage service can retrieve the image manifest from the image repository service, create a new storage volume based on the one or more snapshots identified by the image manifest, and link the created storage volume to the virtualization container.

Figure 9:
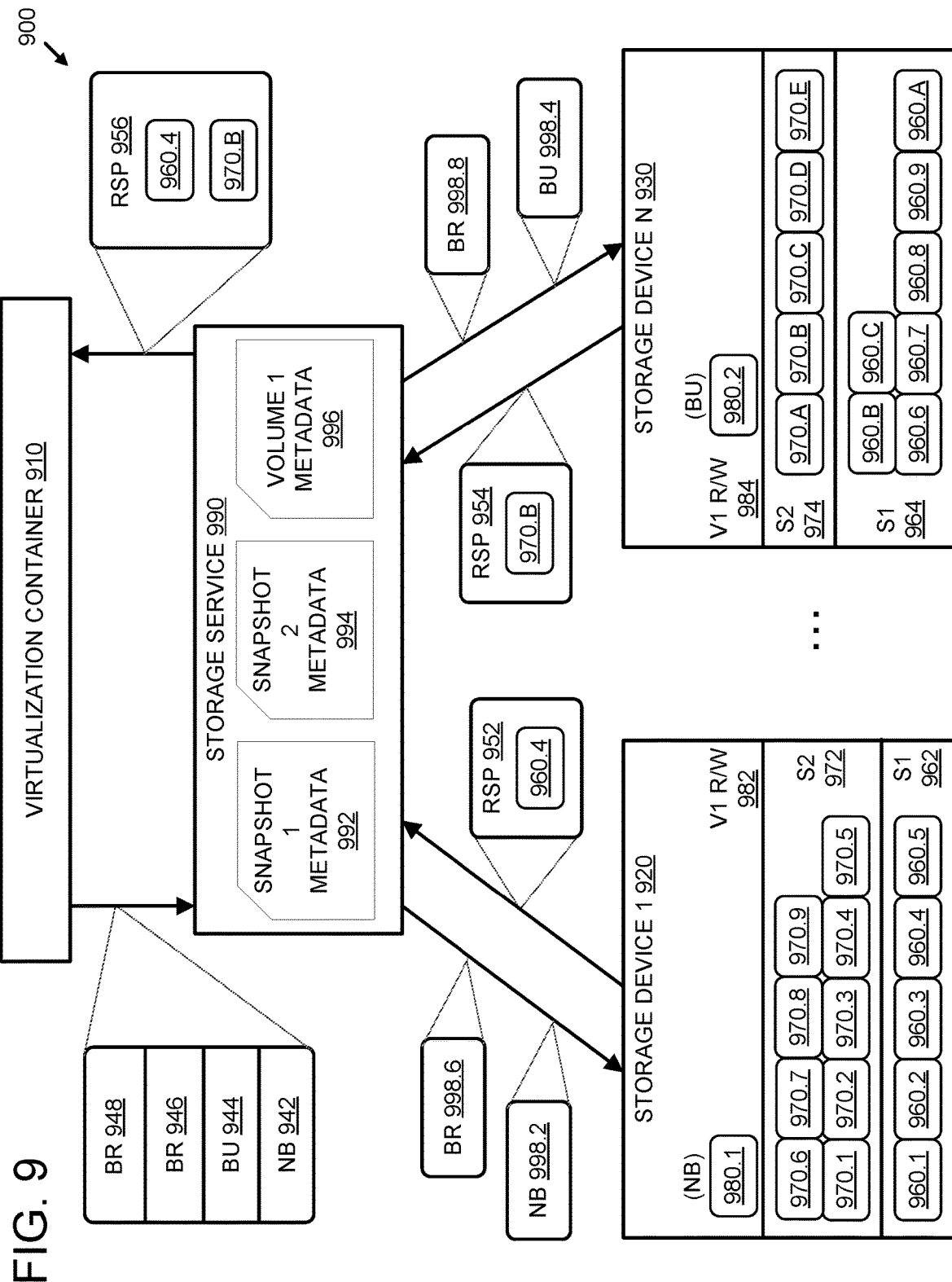
FIG. 9 is a system diagram showing an example system configured to service data access requests from a virtualization container using a layered storage volume stored in a distributed block storage.

FIG. 9 is a system diagram showing an example system 900 configured to service data access requests from a virtualization container 910 using a layered storage volume stored in a distributed block storage. The distributed block storage in the example system 900 comprises multiple storage devices 920-930 configured to store multiple blocks of data (e.g., 960.1-980.2).

In at least one embodiment, the multiple storage devices 920-930 can be logical storage devices comprising multiple storage media. In such an embodiment, data blocks written to a storage device, of the storage devices 920-930, can be written to separate storage media of the storage device. In a different or further embodiment, a data block written to a storage device can be stored redundantly on multiple storage media of the storage device. In a particular embodiment, a logical storage device can comprise a storage controller connected to multiple physical storage media, wherein the storage controller is configured to receive data blocks and write the received data blocks to the multiple connected physical storage media. Examples of logical storage devices in Just a Bunch of Disks (JBOD) enclosures, Redundant Array of Independent Disks (RAID) enclosures, etc.

The virtualization container 910 is configured to transmit multiple data access requests (e.g., 942-948) to a storage service 990. The example data access requests 942-948 are presented for illustration purposes. Other data access requests are also possible. Although the example data access requests 942-948 are depicted as comprising a single data transmission from the virtualization container 910 to the storage service 990, data access requests can be transmitted in separate transmissions as well.

The storage service 990 is configured to receive the data access requests from the virtualization container 910 and to process the data access requests using one or more remote storage volumes stored in the distributed block storage devices 920-930. The storage service 990 can comprise metadata about one or more storage volumes and/or read-only data snapshots stored in the distributed block storage devices 920-930. For example, in FIG. 9 the storage service 990 is depicted as comprising metadata 996 for a storage volume 1 that is based on two snapshots stored in the distributed block storage devices 920-930. The storage service 990 is also depicted as comprising metadata 992 for a snapshot 1 and metadata 994 for a snapshot 2, on which the storage volume 1 is based. The storage service 990 can use the storage volume metadata 996 to identify the read-only data snapshots stored in the distributed block storage devices 920-920, on which the storage volume 1 is based. The storage service 990 can use the snapshot metadata to identify storage locations for data blocks in the distributed block storage devices 920-930 associated with a snapshot. For example, using the metadata 992 for the read-only data snapshot 1, the storage service 990 can determine that the data blocks 960.1-960.5 in the storage location 962 on the storage device 920 are associated with the read-only data snapshot 1. Additionally or alternatively, the storage service 990 can use the metadata 992 to determine that the data blocks 960.6-960.0 in the storage location 964 on the storage device 930 are associated with the snapshot 1.

The storage service 990 can use the metadata 994 to determine that the data blocks 970.1-970.9 in the storage location 972 on the storage device 920 are associated with the read-only data snapshot 2. Additionally or alternatively, the storage service 990 can use the metadata 994 to determine that the data blocks 970.A-970.E in the storage location 974 on the storage device 930 are associated with the read-only data snapshot 2.

The storage service 990 can analyze the data access request 942 to determine that the data access request 942 is a request to add a new data block to the storage volume 1. The storage service 990 can analyze the metadata 996 for the storage volume 1 to attempt to locate a read-write storage layer associated with the storage volume 1. Using the metadata 996, storage service 990 can determine that the storage volume 1 is associated with a read-write storage layer comprising a storage location 982 on the storage device 920, and a storage location 984 on the storage device 930. The storage service 990 can then select one of the identified storage locations and write the new data block to the selected storage location. For example, FIG. 9 depicts the storage service 990 as transmitting the new block request 998.2 to the storage device 920 to write the new data block 980.1 to the storage location 982.

The storage service 990 can analyze the data access request 944 to determine that the data access request 944 is a request to update a data block stored in the storage volume 1. The storage service 990 can inspect the metadata 994 and/or 992 to identify a read-only data snapshot associated with the storage volume 1 that contains the data block to be updated. For example, the storage volume 1 can be based directly on the read-only data snapshot 2, which in turn can be based on the read-only data snapshot 1. To identify a most recent version of the data block to be updated, the storage service 990 can begin by inspecting the metadata 994 associated with the read-only data snapshot 2, on which the storage volume 1 is directly based, to attempt to identify a pointer to a storage location associated with the read-only data snapshot 2 that is associated with an address (such as a logical block address) of the data block to be updated. If the storage service 990 does not find such a pointer in the metadata 994 for the read-only data snapshot 2, the storage service 990 can then inspect the metadata 992 for the read-only data snapshot 1 to attempt to locate a pointer associated with the address of the data block to be updated. For example, the storage service 990 can identify a pointer to the data block 970.B in the storage location 974 on the storage device 930 by inspecting the metadata 994 associated with the read-only data snapshot 2.

Once the data of block to be updated has been identified, the storage service 990 can copy the data block to a storage location associated with the read-write storage layer for the storage volume 1 and then update contents of the copied data block based on the data contained in the data update request. In FIG. 9, the storage service 990 this depicted as transmitting a block update command 998.4 to the storage device 930 to copy the data block to be updated (for example data block 970.B) to the storage location 984 associated with the read-write storage layer of the storage volume 1 as data block 980.2, and then to modify the contents of the data block 980.2 using the data received in the data access request 944. In at least one embodiment, the block update command 998.4 can comprise more than one data operation command.

The storage service 990 can then update the metadata 996 for the storage volume 1 to associate a pointer to the updated data block 980.2 with the address of the data block received in the data access request 944. If the storage service 990 receives a subsequent data access request targeting the data block, the storage service 990 can inspect the metadata 996 and determined that the target of the read operation is the data block that was the target of previous update operation. The storage service 990 can then process the data read request using the updated data block 980.2 by following the pointer in the metadata 996 associated with the data block address.

The storage service 990 can determine that a data access request comprises a request for a data block associated with a read-only data snapshot. The storage service 990 can process the request, at least in part, by retrieving the data block from a storage device of the distributed block storage devices 920-930. For example, storage service 990 can determine that the data access request 946 is a read request for a data block. The storage service 990 can use the metadata (e.g., 992 and/or 994) to identify a location where the requested data block is stored in the distributed block storage devices 920-930. In FIG. 9, the storage service 990 this depicted as determining, using the metadata 992 for the read-only data snapshot 1, that the data access request 946 is a request for the data block 960.4. The storage service 990 transmits a block read command 998.6 to the storage device 920 to retrieve the data block 960.4 from the storage location 962 associated with the read-only data snapshot 1. The storage device 920 transmits a response 952 comprising the data block 960.4 to the storage service 990.

The storage service 990 can determine that the data access request 948 comprises a request for a data block. Using the snapshot metadata 994, the storage service can determine the request is for the data block 970.B. The storage service 990 can then transmit a block read command 998.8 to the storage device 930 to retrieve the data block 970.B from the storage location 970 associated with the read-only data snapshot 2. The storage device 930 transmits the response 954 comprising the data block 970.B to the storage service 990.

In response to receiving a requested data block from one of the distributed block storage devices 920-930, the storage service 990 can transmit the received data block to the virtualization container 910. For example, after receiving the data blocks 960.4 and 970.B from the storage devices 920 and 930, respectively, the storage service 990 transmits a response 956 to the virtualization container 910 comprising the data blocks 960.4 and 970.B. Although the response 956 is depicted as comprising both the data blocks 960.4 and 970.B, the storage service 990 can be configured to transmit received a blocks in separate responses as well.

In at least one embodiment, the virtualization container 910 can transmit a request to the storage service 990 to create a new snapshot based on the storage volume 1. The storage service 990 can identify one or more data blocks stored in the distributed block storage devices 920-930 associated with a read-write storage layer of the storage volume 1. For example, the storage service 990 can inspect the metadata 996 to identify the storage locations in the distributed block storage devices 920-930 associated with the read-write storage layer for the storage volume 1 (e.g., 982 and 984). After identifying the one or more data blocks associated with the storage volume 1 (e.g., 980.1 and 980.2), the storage service 990 can create a read-only snapshot of the identified data blocks and store the read-only snapshot in the distributed block storage devices 920-920. In one embodiment, the storage service 990 identifies one or more available storage locations in the distributed block storage devices 920-920 and stores the data blocks in the read-only snapshot in the identified one or more storage locations. In a different or further embodiment, the storage service 990 converts the storage locations 982 and 984 associated with the storage volume 1's read-write storage layer to a new read-only snapshot. Creating the read-only snapshot can further comprise creating new metadata stored at the storage service 990 for the new snapshot.

The storage service 990 can identify one or more different read-only snapshots, on which the storage volume was based, and create a new image snapshot manifest for a new container image based on the created read-only snapshot. For example, the storage service 990 can determine that the storage volume 1 is based on the read-only data snapshot 2, which in turn is based on the read-only data snapshot 1. The storage service 990 can then create the image snapshot manifest and indicate in the manifest that the created read-only snapshot is based on the read-only data snapshot 2, which in turn is based on the read-only data snapshot 1. In at least one embodiment, the storage service 990 can then transmit the image snapshot manifest to image repository server.

Another virtualization container (not shown) can be configured to transmit a request to the storage service 990 to generate a new remote storage volume based on the new container image. The another virtualization container can then, for example, present a virtual storage volume that is associated with the new remote storage volume to a process running in the another virtualization container as if it was a physical storage volume connected to the another virtualization container. The storage service 990 can be configured to receive such a request and to generate the new remote storage volume based on the new container image. For example, the storage service 990 can analyze the image manifest to identify the multiple read-only data snapshots associated with the new container image and to create a new remote storage volume associated with the identified read-only snapshots. In at least one embodiment, creating the new remote storage volume comprises creating new storage volume metadata on the storage service 990 that associates the new storage volume with the identified read-only snapshots stored in the distributed block storage devices 920-930.

Figure 10:
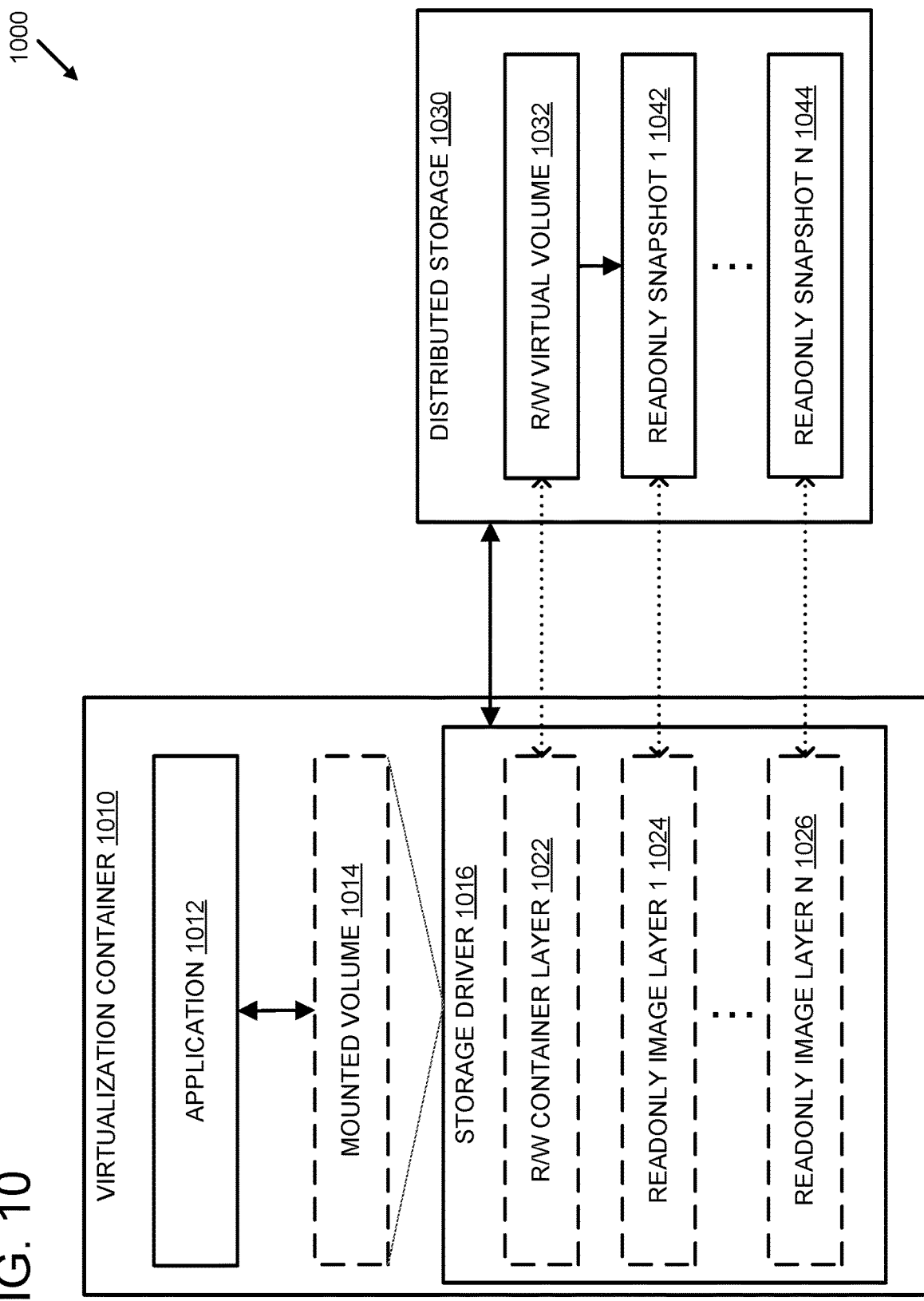
FIG. 10 is a system diagram showing an example system configured to present a mounted volume to an application in a virtualization container based on a layered virtual volume in a distributed storage.

FIG. 10 is a system diagram showing an example system 1000 configured to present a mounted volume 1014 to an application 1012 in a virtualization container 1010 based on a layered virtual volume 1032 in the distributed storage 1030. A storage driver 1016 is configured to present a representation of the mounted volume 1014 to the application 1012 based on data stored in the layered virtual volume 1032. The storage driver 1016 is configured to treat read-only snapshots 1042-1044 as if they were read-only image layers 1024-1026. However, instead of copying read-only snapshots 1042-1044 locally to a storage device connected directly to a host computer containing the virtualization container 1010, the storage driver 1016 accesses the read-only snapshots 1042-1044 in the distributed storage 1030 over a network. The storage driver 1016 is configured to treat the read-write virtual volume 1032 as if it were a read-write container layer 1022 stored locally. When the storage driver 1016 receives a request to add, modify, and/or delete data in the mounted volume 1014 from the application 1012, the storage driver processes the request using the read-write virtual volume 1032 and one or more of the read-only snapshots 1042-1044 stored in the distributed storage 1030.

In at least one embodiment, the distributed storage 1030 comprises a caching layer (not shown) where frequently accessed data stored in the distributed storage 1030 can be accessed more quickly than if the data was retrieved from storage locations in the distributed storage 1030. The storage driver 1016 can be configured to access frequently used snapshot and virtual volume data in such a caching layer in order to improve data access times.

In a different or further embodiment, the storage driver 1016 can store metadata describing data locations of data in the virtual volume 1032 and/or the read-only snapshots 1042-1044. The storage driver 1016 can use such metadata to identify one or more locations of data requested by the application 1012 before transmitting any data requests to the distributed storage 1030.

In a different or further embodiment, data associated with the virtual volume 1032 and/or the read-only snapshots 1042-1044 can be stored redundantly across multiple storage devices in the distributed storage 1030. In such an embodiment, the storage driver 1016 can be configured to process data access requests received from the application 1012 by transmitting requests for data to multiple storage devices in the distributed storage 1030.

Figure 11:
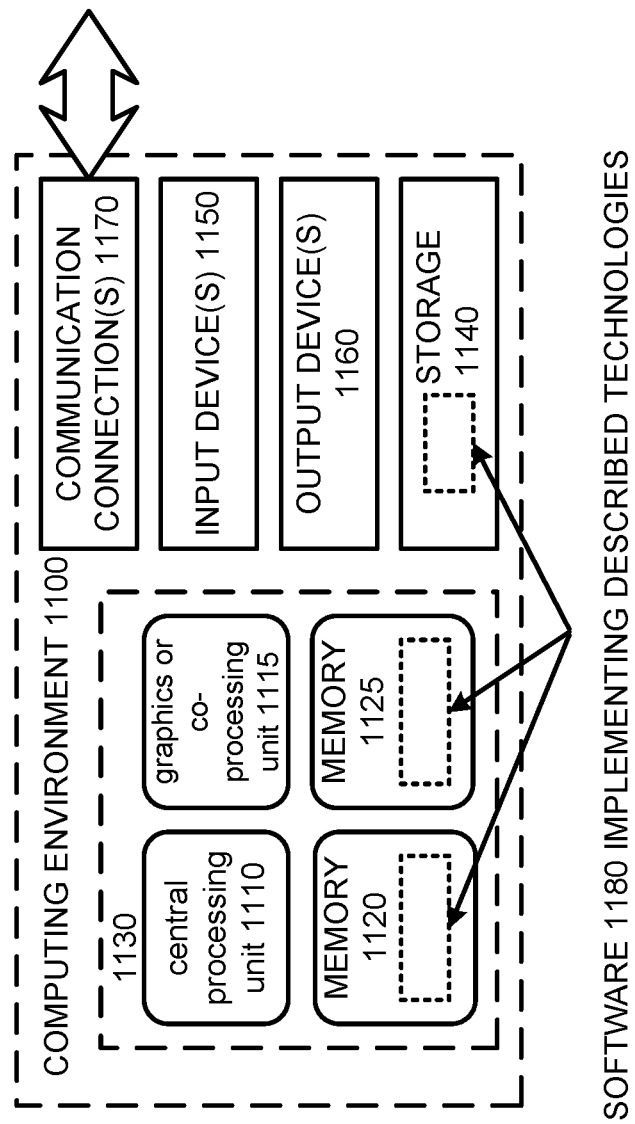
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

In at least some embodiments, the computing environment 1100 can be used as an example host computer as described herein. In different or further embodiments, the computing environment 1100 can be used as a server computer comprising a storage service as described herein.

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein. In at least some embodiments, storage 1140 comprises one or more of the example storage devices as described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method, comprising:
   instantiating a virtualization container from a virtualization container image on top of an operating system kernel of a host, wherein the virtualization container image comprises a plurality of read-only image layers;
   receiving a command to create a storage volume for the virtualization container based on an image manifest comprising a list of the plurality of read-only image layers of the virtualization container image;
   identifying a read-only image layer of the plurality of read-only image layers of the virtualization container image;
   searching a remote storage device for a snapshot associated with the read-only image layer of the plurality of read-only image layers of the virtualization container image; and
   if a snapshot associated with the read-only image layer of the plurality of read-only image layers of the virtualization container image is found, creating a remote storage volume in the remote storage device based on the snapshot and connecting the virtualization container to the remote storage volume;
   otherwise, creating a new snapshot in the remote storage device using data for the read-only image layer of the plurality of read-only image layers of the virtualization container image and connecting the virtualization container to a remote storage volume in the remote storage device that is based on the new snapshot.

2. The method of claim 1, further comprising:
   presenting the new remote storage volume to a process running in the new virtualization container as a mounted volume; and
   tunneling data access operations targeting the mounted volume to the remote storage volume.

3. The method of claim 1, wherein creating the new snapshot in the remote storage device using data for the read-only image layer of the plurality of read-only image layers of the virtualization container image and connecting the virtualization container to a remote storage volume in the remote storage device that is based on the new snapshot comprises:
   creating the remote storage volume in the remote storage device;
   writing the data for the read-only image layer of the plurality of read-only image layers of the virtualization container image to a read-write storage layer of the remote storage volume;
   creating the new snapshot using the data in the read-write storage layer of the remote storage volume; and
   associating the new snapshot with the remote storage volume.

4. The method of claim 1, further comprising:
   receiving a command to create a new image for the virtualization container;
   responsive to receiving the command, creating a new snapshot of the remote storage volume connected to the virtualization container, wherein creating the new snapshot of the remote storage volume comprises:
      determining differences between the remote storage volume and another snapshot, wherein the another snapshot is a snapshot on which the remote storage volume is based,
      storing the differences in the new snapshot, and
      associating the new snapshot with the another snapshot with a relationship that indicates the new snapshot is based on the another snapshot;
   storing the created snapshot in the remote storage device; and
   registering the created snapshot as the new image with an image repository.

5. The method of claim 4, further comprising:
   receiving a data write request from a process running in the virtualization container;
   creating a read-write storage layer in the remote storage volume;
   writing data contained in the data write request to the read-write storage layer; and
   wherein determining differences between the remote storage volume and the another snapshot comprises:
      identifying the data written to the read-write storage layer, and
      storing a read-only copy of the identified data in the new snapshot.

6. The method of claim 5, further comprising:
   determining that the data write request comprises a request to modify data stored in the another snapshot;
   copying the data to be modified from the another snapshot to the read-write storage layer; and
   modifying the copy of the data in the read-write storage layer.

7. The method of claim 4, further comprising:
   generating an image manifest that identifies the new snapshot, the another snapshot, and the relationship between the new snapshot and the another snapshot; and
   transmitting the image manifest to the image repository.

8. The method of claim 4, wherein:
the remote storage device is one of multiple storage devices in a distributed block storage; and
storing the new snapshot in the remote storage device comprises storing multiple data blocks associated with the new snapshot in the remote storage device.

9. The method of claim 8, further comprising:
receiving a request for data from a process running in the virtualization container;
determining that the requested data comprises a data block associated with the new snapshot that is stored in the remote storage device; and
retrieving the data block from the remote storage device.

\* \* \* \* \*